US012592594B2

(12) United States Patent
Yang et al.

(10) Patent No.: US 12,592,594 B2
(45) Date of Patent: Mar. 31, 2026

(54) ROTOR STRUCTURE, MOTOR STRUCTURE, AND LAUNDRY TREATMENT DEVICE

(71) Applicant: MIDEA WELLING MOTOR TECHNOLOGY (SHANGHAI) CO., LTD., Shanghai (CN)

(72) Inventors: Xiong Yang, Shanghai (CN); Wenrui Li, Shanghai (CN)

(73) Assignee: MIDEA WELLING MOTOR TECHNOLOGY (SHANGHAI) CO., LTD., Shanghai (CN)

( * ) Notice: Subject to any disclaimer, the term of this patent is extended or adjusted under 35 U.S.C. 154(b) by 203 days.

(21) Appl. No.: 18/387,570

(22) Filed: Nov. 7, 2023

(65) Prior Publication Data

US 2024/0072584 A1       Feb. 29, 2024

Related U.S. Application Data

(63) Continuation of application No. PCT/CN2021/118057, filed on Sep. 13, 2021.

(30) Foreign Application Priority Data

May 10, 2021    (CN) .......................... 202110507285.8
May 10, 2021    (CN) .......................... 202120984733.9

(51) Int. Cl.
*H02K 1/276*          (2022.01)
*H02K 29/03*          (2006.01)

(52) U.S. Cl.
CPC ........... *H02K 1/2773* (2013.01); *H02K 29/03* (2013.01)

(58) Field of Classification Search
CPC .......................... H02K 1/2773; H02K 2213/03
(Continued)

(56) References Cited

U.S. PATENT DOCUMENTS

| | | | | |
|---|---|---|---|---|
| 4,270,411 A | * | 6/1981 | Pengo | D06F 37/36 192/105 CD |
| 7,932,658 B2 | * | 4/2011 | Ionel | H02K 1/276 310/156.52 |

(Continued)

FOREIGN PATENT DOCUMENTS

| | | |
|---|---|---|
| CN | 104937815 A | 9/2015 |
| CN | 106208450 A | 12/2016 |

(Continued)

OTHER PUBLICATIONS

English Translation of CN107591911A (Year: 2018).*

(Continued)

*Primary Examiner* — Terrance L Kenerly
*Assistant Examiner* — Theodore L Perkins
(74) *Attorney, Agent, or Firm* — Scully, Scott, Murphy & Presser, P.C.

(57) ABSTRACT

A rotor structure, a motor structure, and a laundry treatment device are provided. The rotor structure has a rotor iron core, multiple permanent magnets and multiple magnetic barriers. The rotor has multiple permanent magnet slots arranged along a circumferential direction of the rotor core. The permanent magnets are disposed in the permanent magnet slots respectively. The magnetic barriers are disposed on the rotor iron core. The rotor structure can rotate unidirectionally or bidirectionally in the circumferential direction. At least one side of a permanent magnet slot is provided with the magnetic barriers in the rotation direction of the rotor structure. Two ends of each magnetic barrier face towards the permanent magnet corresponding to the permanent magnet slot and towards the outer edge of the rotor core, respectively.

19 Claims, 15 Drawing Sheets

(58) Field of Classification Search
USPC ..................................................... 310/156.56
See application file for complete search history.

(56) References Cited

U.S. PATENT DOCUMENTS

| | | | | |
|---|---|---|---|---|
| 2012/0248915 A1* | 10/2012 | Kagami | ............... | H02K 1/2766 |
| | | | | 310/156.01 |
| 2015/0270752 A1* | 9/2015 | Tanaka | ................. | H02K 1/2766 |
| | | | | 310/156.56 |
| 2020/0220398 A1 | 7/2020 | Takahashi et al. | | |

FOREIGN PATENT DOCUMENTS

| | | | | |
|---|---|---|---|---|
| CN | 107276353 | A | | 10/2017 |
| CN | 107591911 | A | * | 1/2018 |
| CN | 110739785 | A | | 1/2020 |
| CN | 210246428 | U | | 4/2020 |
| CN | 210985766 | U | | 7/2020 |
| CN | 211296516 | U | | 8/2020 |
| CN | 111914442 | A | | 11/2020 |
| CN | 212258580 | U | | 12/2020 |
| CN | 112467907 | A | | 3/2021 |
| CN | 113113992 | A | | 7/2021 |
| CN | 113162275 | A | | 7/2021 |
| CN | 113162276 | A | | 7/2021 |
| CN | 214755782 | U | | 11/2021 |

OTHER PUBLICATIONS

International Search Report dated Dec. 20, 2021 issued in PCT/CN2021/118057.

First Office Action dated Mar. 21, 2025 for Chinese Patent Application No. 202110507285.8.

Extended European search report dated Sep. 16, 2024 received in European Patent Application No. 21941591.6.

* cited by examiner

A

106

B

106

$w1$

104

$w2$

100

106

102

104

103

$w$

100

100

100

106

102

104

103

*w*

100

106

102

104

103

*w*

100

106

102

104

103

*w*

C     D

106

104

1024

1022

1062

C     d

1064

100

106

102

104

103

100

106

102

104

103

100

106

102

104

103

*w*

200

106
102
104
103
202
204 w

200

106

102

104

103

202

204

*w*

300

302

200

ROTOR STRUCTURE, MOTOR STRUCTURE, AND LAUNDRY TREATMENT DEVICE

CROSS-REFERENCE TO RELATED APPLICATIONS

This application is a continuation application of International Application No. PCT/CN2021/118057 filed on Sep. 13, 2021, which claims priority to and benefits of Chinese Patent Application No. 202110507285.8 filed with China National Intellectual Property Administration on May 10, 2021 and entitled "ROTOR STRUCTURE, MOTOR STRUCTURE, AND LAUNDRY TREATMENT DEVICE", and Chinese Patent Application No. 202120984733.9 filed with China National Intellectual Property Administration on May 10, 2021 and entitled "ROTOR STRUCTURE, MOTOR STRUCTURE, AND LAUNDRY TREATMENT DEVICE", the entire contents of each of which are herein incorporated by reference for all purposes. No new matter has been introduced.

FIELD

The present disclosure relates to the field of laundry treatment devices, and particularly relates to a rotor structure, a motor structure, and a laundry treatment device.

BACKGROUND

For a laundry treatment device, the performance of a motor disposed therein is an important factor for determining the advantage and disadvantage of the use of the laundry treatment device. In the prior art, the requirements for the performance and the performance-cost ratio of the motor gradually become higher, and for the motor, under the action of quadrature axis armature reaction, the magnetic saturation degree of the motor will be deepened, which impedes improvements of the performance of the motor.

SUMMARY

The present disclosure aims to solve at least one of the problems that exist in the prior art or related art.

In view of this, the embodiment of the first aspect of the present disclosure proposes a rotor structure.

The embodiment of the second aspect of the present disclosure proposes a motor structure.

The embodiment of the third aspect of the present disclosure proposes a laundry treatment device.

In order to achieve the above purposes, the embodiment of the first aspect according to the present disclosure proposes a rotor structure, comprising: a rotor core, having a plurality of permanent magnet slots arranged along the circumferential direction of the rotor core; permanent magnets positioned within the permanent magnet slots; and magnetic barriers placed on the rotor core, the rotor structure being capable of rotating unidirectionally or bidirectionally along the circumferential direction, at least one side of each permanent magnet slot being provided with a magnetic barrier in the rotation direction of the rotor structure, and two ends of each magnetic barrier respectively facing towards the permanent magnet and the outer edge of the rotor core.

The rotor structure proposed by the embodiment according to the first aspect of the present disclosure comprises the rotor core and the permanent magnets disposed in the rotor core, so that the rotor structure is driven under the magnetic action of the permanent magnets, and can rotate with respect to a stator, to achieve the normal operation of a motor. In an embodiment, the permanent magnet slots, which pass through two end surfaces, are provided in the rotor core; the permanent magnets can be positioned within the permanent magnet slots, which can help drive the permanent magnets by a magnetic force. The magnetic barriers are further placed on the rotor core; by setting that the extending directions of the two ends of the magnetic barrier to face the permanent magnet and the outer edge, the magnetic barriers can be used as a structure for relieving the degree of magnetic saturation and the magnetic barriers are formed in the rotating process of the rotor structure. Thus, the power density and torque density of the motor can be improved, the overload capacity of the motor can be improved, the torque ripple of the motor can be effectively improved, and the performance of the motor can be significantly improved. Therefore, on the basis of decreasing the amount of the permanent magnets of the motor (i.e., decreasing the production costs), the cost-effectiveness and product-competitiveness of the motor adopting the rotor structure can be improved.

It needs to be emphasized that there are differences in the rotation directions of the rotor structure in the present disclosure due to the limiting of the motor. In an embodiment, the rotor structure may be used for an unidirectional motor, and thus, for the unidirectional motor. The position of the magnetic barrier can be disposed according to the rotation directions of the rotor structure, to satisfy the needs on the performance of the motor on the basis of further reducing the processing costs.

Furthermore, in an exemplary embodiment, the magnetic barriers are only provided at one side of the permanent magnet slots; in another exemplary embodiment, the magnetic barriers are provided at the two sides of the permanent magnet slots in a magnetization direction, i.e., the two sides of the rotor core in the circumferential direction.

For the rotor structure according to the present solution, on the one hand, on the basis of suppressing the quadrature axis armature reaction of the motor, relieving the degree of magnetic saturation and reducing the load counter-electromotive force, and improving the torque density and the overload capacity of the motor, the positions of the magnetic barriers can be configured according to the limiting of the rotation direction of the rotor structure; on the other hand, the rotor core is hollowed to form the magnetic barriers, and thus, the amount of rare earth permanent magnets can further be reduced.

A plurality of permanent magnet slots are provided, and generally, the plurality of permanent magnet slots are provided uniformly around the axis of the rotor core.

The extending direction of the permanent magnet slots can be the axial direction of the rotor core, and can further be a direction which forms a certain angle with the axial direction, and apparently, out of the consideration of the processing costs and the processing difficulty, generally, the permanent magnet slots only need to be disposed along the axial direction and pass through the two end surfaces of the rotor core.

In addition, for the permanent magnet slots, it may be that at least one of the two ends passes through the end surface. In an embodiment, both of the two ends pass through, or one end passes through, or neither of the two ends pass through the end surface.

It can be understood that for the rotor core, the permanent magnet slots and the circumferential edge of the rotor core are located at two directions, and thus the magnetic barriers themselves will have certain bending through setting that the two ends of the magnetic barriers respectively face the permanent magnets and the outer edge of the rotor core.

In addition, the rotor structure in the above embodiment proposed in the present disclosure can further have the following features:

in the above embodiment, the cross section of the permanent magnet slots presents a polygonal shape, and the cross section of the permanent magnet slots is a centrosymmetric structure.

In the embodiment, through setting that the shape of the cross section of the permanent magnet slots is a polygonal shape, the polygonal permanent magnet slots can help better occupy the space of the rotor core, i.e., the inner space of the rotor core can be sufficiently used, so that the torque density is optimized.

In the above embodiment, the permanent magnet slots comprise a first slot portion, a second slot portion and a third slot portion, which are connected along the radial direction of the rotor core. The width of the first slot portion is less than or equal to the width of the second slot portion, and the width of the third slot portion is less than or equal to the width of the second slot portion.

In the embodiment, the permanent magnet slots which present the polygonal shape comprise the first slot portion, the second slot portion and the third slot portion, and the three slot portions are connected successively. The second slot portion which is located in the middle is relatively wider, the first slot portion and the third slot portion which are located at the two sides are narrower, and this further helps satisfy the magnetization requirement on the basis of helping the assembling.

The width is the size of the permanent magnet slots in the magnetization direction.

In the above embodiment, the rotor structure rotates unidirectionally, and at least one magnetic barrier which corresponds to each permanent magnet slot is provided at the front side of the permanent magnet slot in the rotation direction of the rotor structure.

In the embodiment, in the case that the rotor structure rotates unidirectionally, in the rotation direction of the rotor structure, it is set that the magnetic barriers are disposed at the front side of the permanent magnet slots, i.e., the magnetic barriers are disposed at the weak magnetic side of the permanent magnet slots. When the rotor structure rotates, the permanent magnets will form a weak magnetic side and a strong magnetic side in the magnetization direction, through disposing the magnetic barriers at the weak magnetic side of the permanent magnet slots, suppression of the quadrature axis armature reaction of the motor can be satisfied, to relieve the degree of saturation of the rotor core.

It can be understood that the front side of the permanent magnet slots is the side of a fixed position that the rotor structure firstly passes during the rotation. In an embodiment, when rotating along the clockwise direction, the entire rotor structure is divided into a plurality of sector structures, and as for each sector structure, if the permanent magnet slots are disposed in the six o'clock direction, the magnet barriers will be disposed in the seven o'clock direction.

In the above embodiment, the magnetic barriers comprise: a first slot segment, extending towards the permanent magnet slots; a second slot segment, communicating with the first slot segment; and the second slot segment extends towards the circumferential edge of the rotor core.

In the embodiment, the magnetic barrier mainly comprises two parts, which are respectively the first slot segment and the second slot segment. The first slot segment communicates with the second slot segment. The ends of the first slot segment and the second slot segment, which deviate from each other, face the permanent magnet slots and the circumferential edge of the rotor core, respectively. The two parts of the magnetic barrier respectively face the structures of different positions, and the two parts need to communicate with each other. Under the joint action of the two parts, suppression of the quadrature axis armature reaction of the motor can be achieved effectively, and thus the degree of magnetic saturation is relieved.

In the above embodiment, in the cross section of the rotor core, the rotor core is divided into 2P sector regions by the plurality of permanent magnet slots, and the angle between the extending direction of the first slot segment and the extending direction of the permanent magnet slots is [(180°/2P), 90°]; in the cross section of the rotor core, the angle between the extending direction of the second slot segment and the rotation direction of the rotor core is [60°, 120°].

In the embodiment, through setting the extending directions of the first slot segment and the second slot segment, under the action of the magnet barriers, the quadrature axis armature reaction of the motor can be suppressed effectively, and the degree of magnetic saturation can be relieved effectively, to improve the power density and the torque density of the motor, the overload capacity of the motor and the torque ripple of the motor. In an embodiment, the cross section of the rotor core is the normal plane of the axis of the rotor core, in the cross section, the angle between the extending direction of the first slot segment and the extending direction of the permanent magnet slots is greater than or equal to 180°/2P, and less than or equal to 90°. 2P is the number of the sector regions, when the cross section of the rotor core is a ring shape, 2P further is the number of the permanent magnet slots. In a further embodiment, in the cross section, the extending direction of the second slot segment and the rotation direction of the rotor core can be orthogonal or approximately orthogonal, and the angle range therebetween can be greater than or equal to 60°, and less than or equal to 120°.

In the above embodiment, the one end of the first slot segment which is away from the second slot segment communicates with the permanent magnet slots.

In the embodiment, through setting that the end of first slot segment facing the permanent magnet slot is directly communicated to the permanent magnet slot, in the processing, it can be cut directly from the side of the permanent magnet slot to extend into the rotor core, which facilitates the processing. For the structure, the first slot segment is directly communicated to the permanent magnet slot, to achieve the effect of suppressing the quadrature axis armature reaction of the motor.

In the above embodiment, there is a first distance between the one end of the first slot segment, which is away from the second slot segment, and the permanent magnet slots.

In the embodiment, the end of first slot segment facing the permanent magnet slot is set so that it does not communicate with the permanent magnet slot, i.e., there is a certain distance therebetween, and for the entirety of the magnet barrier, one end is a closed structure, and as for the structure, there is a certain gap between the first slot segment and the permanent magnet slot, and this can further achieve the effect of suppressing the quadrature axis armature reaction of the motor.

In the above embodiment, the first distance is greater than or equal to 0.2 mm.

In the embodiment, when the first slot segment does not communicate with the permanent magnet slots, the distance therebetween needs to be greater than or equal to 0.2 mm, to help ensure the structure strength of the rotor core between the first slot segment and the permanent magnet slots when the rotor core is processed.

In the above embodiment, the end of the second slot segment away from the first slot segment communicates with the circumferential edge of the rotor core.

In the embodiment, through setting that the end of the second slot segment facing the circumferential edge is directly communicated to the circumferential edge, in the processing, it is directly cut from the outer side of the rotor core to extend into the rotor core, and this helps the processing. For the structure, the second slot segment is directly communicated to the circumferential edge, to achieve the effect of suppressing the quadrature axis armature reaction of the motor.

In the above embodiment, there is a second distance between the end of the second slot segment which is away from the first slot segment and the circumferential edge of the rotor core.

In the embodiment, the end of the second slot segment facing the circumferential edge is set so that it does not communicate with the circumferential edge, i.e., there is a certain distance therebetween, and for the entirety of the magnet barrier, one end is a closed structure, and as for the structure, there is a certain gap between the second slot segment and the circumferential edge, and this can further achieve the effect of suppressing the quadrature axis armature reaction of the motor.

In the above embodiment, the second distance is greater than or equal to 0.2 mm.

In the embodiment, when the second slot segment does not communicate with the circumferential edge, the distance therebetween needs to be greater than or equal to 0.2 mm, to help ensure a certain strength of the circumferential edge when the rotor core is processed.

In the above embodiment, in the plurality of magnet barriers disposed corresponding to the same permanent magnet, the communicating relations between the first slot segments and the permanent magnet slot are consistent, and the communicating relations between the second slot segments and the outer edge of the rotor core are consistent.

In the embodiment, for the plurality of magnetic barriers disposed corresponding to the same permanent magnet slot, through setting that the connecting relations between the first slot segments and the permanent magnet slot and the connecting relations between the second slot segments and the outer edge of the rotor core are respectively consistent, the processing efficiency is improved.

In the above embodiment, in the plurality of magnet barriers disposed corresponding to the same permanent magnet, the communicating relations between the first slot segments of at least two adjacent magnetic barriers and the permanent magnet slot are inconsistent, and the communicating relations between the second slot segments and the outer edge of the rotor core are inconsistent.

In the embodiment, for the plurality of magnetic barriers disposed corresponding to the same permanent magnet slot, the communicating relations of the first slot segments and the second slot segments are staggered, it can be understood that there will be a relatively great armature suppression effect if the first slot segments communicate with the permanent magnet slot, but the strength will be affected in a certain degree due to a direct breaking design, if the first slot segments do not communicate with the permanent magnet slot, a certain strength will be obtained, but the effect of suppressing the armature will be relatively weak; the communicating relations between the second slot segments and the outer edge are in the same way, through the staggered communicating relations, the armature suppression effect and the strength can be improved comprehensively, and the use feasibility of the rotor structure is improved.

In the above embodiment, in the plurality of magnet barriers disposed corresponding to the same permanent magnet, the first slot segment of at least one magnetic barrier does not communicate with the permanent magnet slots, and the second slot segment does not communicate with the outer edge of the rotor core.

In the embodiment, for the plurality of magnetic barriers disposed corresponding to the same permanent magnet slot, through setting that the first slot segments and the second slot segments of the magnetic barriers respectively do not communicate with the permanent magnet slot and the outer edge, it can be understood that the structure strength of the rotor core in the operating process can be improved effectively as the two ends do not communicate, and thus the integral stability of the overall rotor structure in rotating is improved.

In the above embodiment, the first slot segment presents a straight-line shape, the second slot segment presents a straight-line shape, and the angle between the first slot segment and the second slot segment is [60°, 120°].

In the embodiment, both the first slot segment and the second slot segment are straight line segments, which facilitates the processing of the slot segments. Through setting the angle between the two straight line segments, the suppressing effect of the quadrature axis armature reaction can be better facilitated.

In another embodiment, it can further be limited that one of the first slot segment and the second slot segment presents a curved line shape, or both of them present a curved line shape.

In the above embodiment, the rotor core comprises a plurality of laminated punching sheets. Each punching sheet is provided with an assembling port, and the plurality of assembling ports form the permanent magnet slots.

In the embodiment, for the convenience of processing, the rotor core is mainly composed of a plurality of punching sheets, and the rotor core can be formed through laminating the plurality of punching sheets, and it needs to be explained that each punching sheet can be separately processed to form the assembling port during the processing, after the assembling, the plurality of assembling ports can form the permanent magnet slots for accommodating the permanent magnets, to help achieve the rotation of the rotor structure.

In the above embodiment, the plurality of punching sheets form a plurality of core segments disposed along the axial direction, and the plurality of core segments are disposed along the axial direction of the rotor core to form the rotor core.

In the embodiment, the laminated punching sheets are divided into multiple segments, each segment is composed of a plurality of punching sheets, the plurality of core segments are arranged along the axial direction, and this can form the rotor core, to achieve the electromagnetic action of the rotor in the motor.

The embodiment according to the second aspect of the present disclosure proposes a motor structure, comprising: a stator; the rotor structure in the embodiment according to the first aspect, coaxially disposed with the stator, and the rotor structure can rotate with respect to the stator.

The motor structure proposed by the embodiment according to the second aspect of the present disclosure comprises the stator and the rotor structure. The motor structure is provided with the rotor structure in the embodiment according to the first aspect, and thus has the beneficial effects of any of the above rotor structures, which will not be repeated herein.

It needs to be emphasized that, since the motor structure comprises the above rotor structure, on the one hand, the motor structure effectively suppresses the quadrature axis armature reaction of the motor, relieves the degree of magnetic saturation and reduces the load counter-electromotive force, and improves the torque density and overload capacity of the motor, on the other hand, it can further weaken the magnetic field harmonics of the rotor in the air gap and improve the torque ripple of the motor.

The embodiment according to the third aspect of the present disclosure proposes a laundry treatment device, comprising: a housing; and the motor structure in the embodiment according to the above second aspect, provided in the housing.

The laundry treatment device proposed in the embodiment according to the third aspect of the present disclosure comprises the housing and the motor structure disposed in the housing, and an outdoor unit is provided with the motor structure in the embodiment according to the above second aspect, and thus has the beneficial effects of any of the above motor structures, which will not be repeated herein.

The additional aspects and advantages of the present disclosure will be obvious in the following description, or can be understood through the implementation of the present disclosure.

Figure 1:
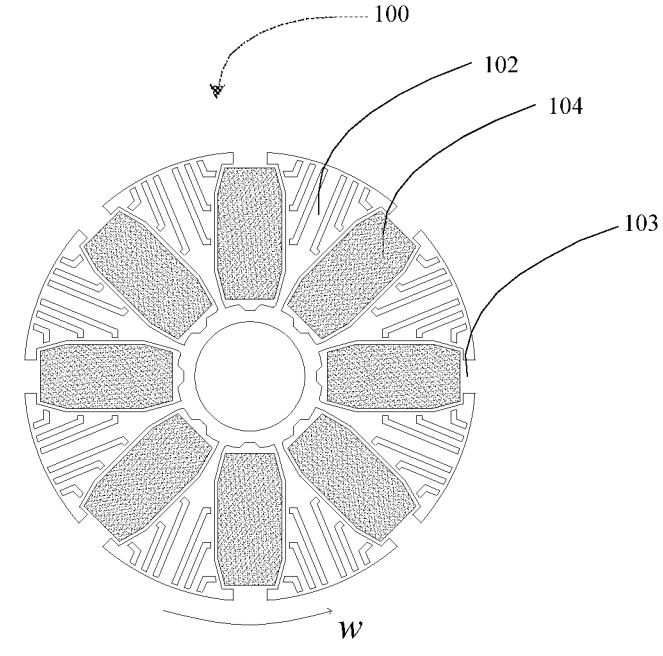
FIG. 1 shows a schematic view of the structure of a rotor structure according to an embodiment of the present disclosure.
Figure 2:
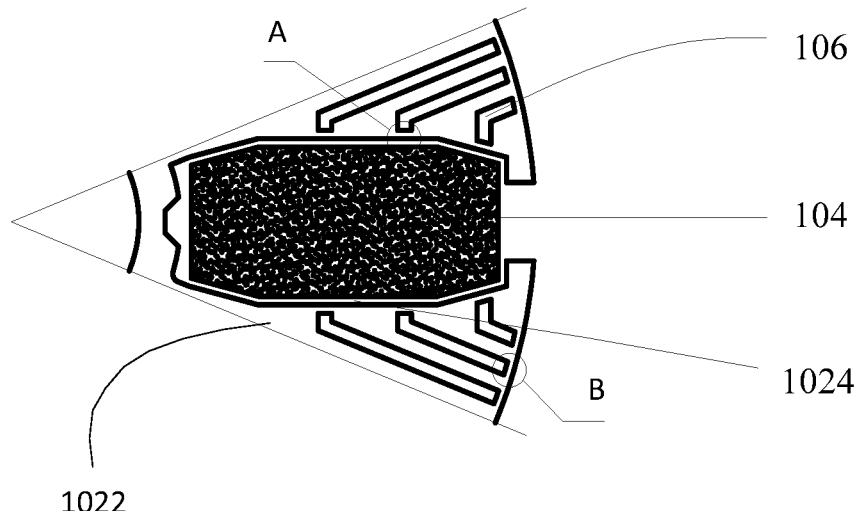
FIG. 2 shows a schematic view of the structure of a rotor structure according to an embodiment of the present disclosure.
Figure 3:
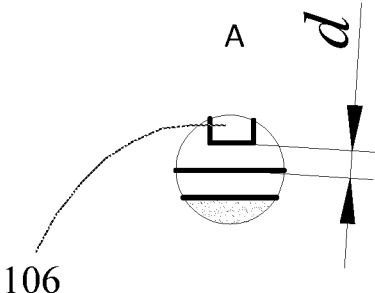
FIG. 3 shows a partially enlarged schematic view of portion A in FIG. 2.
Figure 4:
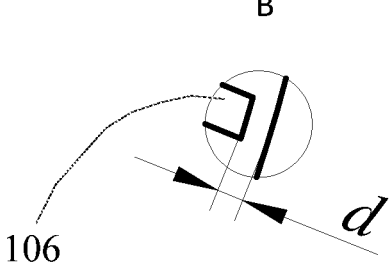
FIG. 4 shows a partially enlarged schematic view of portion B in FIG. 2.
Figure 5:
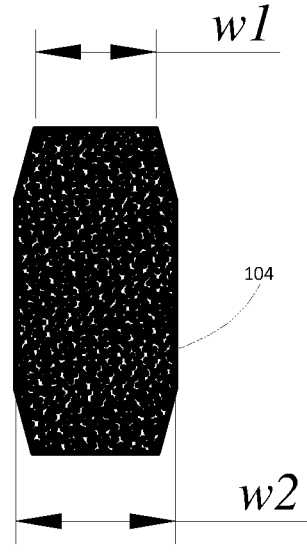
FIG. 5 shows a schematic view of the structure of a portion of punching sheets according to an embodiment of the present disclosure.

The corresponding relationships between the reference signs and the component names in FIGS. 1-23 are provided as follows:

100: rotor structure, 102: rotor core, 1022: punching sheet, 1024: assembling port, 103: permanent magnet slot, 104: permanent magnet, 106: magnetic barrier, 1062: first slot segment, 1064: second slot segment, 200: motor structure, 202: stator, 204: air gap, 300: laundry treatment device, and 302: housing.

DETAILED DESCRIPTION OF THE DISCLOSURE

In order to understand the above-mentioned objectives, features and advantages of the embodiments of the present disclosure more clearly, a further detailed description of the embodiments of the present disclosure will be given below in combination with the accompanying drawings and exemplary embodiments. It should be noted that the embodiments of the present disclosure and the features in the embodiments can be combined with each other if there is no conflict.

In the following description, numerous specific details are set forth in order to provide a thorough understanding of the present disclosure. However, the present disclosure can further be implemented in other manners than those described herein. Therefore, the protection scope of the embodiments of the present disclosure is not limited to the exemplary embodiments disclosed below.

Some embodiments of the present disclosure are described below with reference to FIGS. 1-23.

As shown in FIGS. 1-5, a rotor structure 100 proposed by the embodiment comprises a rotor core and permanent magnets disposed in the rotor core, so that the rotor structure is driven under the magnetic action of the permanent magnets, and can rotate with respect to a stator, to achieve the normal operation of a motor. In an embodiment, permanent magnet slots which pass through two end surfaces are provided in the rotor core, the permanent magnets can be positioned within the permanent magnet slots, which can help drive the permanent magnets by a magnetic force. Magnetic barriers are further placed on the rotor core; through setting that the extending directions of the two ends of the magnetic barrier face the permanent magnet and the outer edge, the magnetic barriers can be used as a structure for relieving the degree of magnetic saturation, and the magnetic barriers are formed in the rotating process of the rotor structure. Thus, the power density and torque density of the motor can be improved, the overload capacity of the motor can be improved, the torque ripple of the motor can be effectively improved, and the performance of the motor can be significantly improved. Therefore, on the basis of decreasing the amount of the permanent magnets of the motor (i.e., decreasing the production costs), the cost-effectiveness and product-competitiveness of the motor adopting the rotor structure can be improved.

It needs to be emphasized that there are differences in the rotation directions of the rotor structure in the present disclosure due to the limiting of the motor, in an embodiment, it may be used for an unidirectional motor, and thus, for the unidirectional motor, the position of the magnetic barrier can be disposed according to the rotation directions of the rotor structure, to satisfy the needs on the performance of the motor on the basis of further reducing the processing costs.

Furthermore, in an exemplary embodiment, as shown in FIGS. 12-20, the magnetic barriers are only disposed at one side of the permanent magnet slots. Furthermore, the magnetic barriers are disposed on the weak magnetic side of the permanent magnet slots, and it can be understood that when the rotor structure rotates, the permanent magnets will form a weak magnetic side and a strong magnetic side in the magnetization direction, and suppressing the quadrature axis armature reaction of the motor can be satisfied, to relieve the degree of saturation of the rotor core.

In an embodiment, in the case that the rotor structure rotates unidirectionally, in the rotation direction of the rotor structure, it is set that the magnetic barriers are disposed at the front side of the permanent magnet slots, i.e., the magnetic barriers are disposed at the weak magnetic side of the permanent magnet slots. When the rotor structure rotates, the permanent magnets will form the weak magnetic side and the strong magnetic side in the magnetization direction, through disposing the magnetic barriers at the weak magnetic side of the permanent magnet slots, suppressing the quadrature axis armature reaction of the motor can be satisfied, to relieve the degree of saturation of the rotor core.

It can be understood that the front side of the permanent magnet slots is the side of a fixed position that the rotor structure firstly passes during the rotation. In an embodiment, when rotating along the clockwise direction, the entire rotor structure is divided into a plurality of sector structures, and as for each sector structure, if the permanent magnet slots are disposed in the six o'clock direction, the magnet barriers will be disposed in the seven o'clock direction.

In another exemplary embodiment, as shown in FIG. 1, the magnetic barriers are provided at the two sides of the permanent magnet slots in a magnetization direction, i.e., the two sides of the rotor core in the circumferential direction.

For the rotor structure 100 according to the present solution, on the one hand, the quadrature axis armature reaction of the motor is effectively suppressed, the degree of magnetic saturation is relieved and the load counter-electromotive force is reduced, and the torque density and the overload capacity of the motor are improved; on the other hand, the rotor core 102 is hollowed to form magnetic barriers 106, and thus, the amount of rare earth permanent magnets 104 can further be reduced.

A plurality of permanent magnet slots 103 can be provided. Generally, the plurality of permanent magnet slots 103 are provided uniformly around the axis of the rotor core 102.

The extending direction of the permanent magnet slots 103 can be the axial direction of the rotor core 102, and can further be a direction which forms a certain angle with the axial direction, and apparently, out of the consideration of the processing costs and the processing difficulty, generally, the permanent magnet slots 103 only need to be disposed along the axial direction and pass through the two end surfaces of the rotor core 102.

In addition, for the permanent magnet slots, it may be that at least one of the two ends passes through the end surface, in an embodiment, both of the two ends pass through, or one end passes through, or neither of the two ends pass through the end surface.

It can be understood that for the rotor core 102, the permanent magnet slots 103 and the circumferential edge of the rotor core 102 are located at two directions, and thus the magnetic barriers 106 themselves will have certain bending, by setting that the two ends of the magnetic barriers 106 respectively face the permanent magnets 104 and the outer edge of the rotor core 102.

Furthermore, for the convenience of processing, the rotor core 102 is mainly composed of a plurality of punching sheets 1022, and the rotor core 102 can be formed through laminating the plurality of punching sheets 1022, and it needs to be explained that each punching sheet 1022 can be separately processed to form the assembling port 1024 during the processing, after the assembling, the plurality of assembling ports 1024 can form the permanent magnet slots 103 for accommodating the permanent magnets 104, to help achieve the rotation of the rotor structure 100.

Furthermore, the rotor core can further be an integrated structure, or can be a multi-segment structure, and if it is the multi-segment structure, the laminated punching sheets can be divided into multiple segments, each segment is composed of a plurality of punching sheets, and the multiple core segments are arranged along the axial direction to form the rotor core, to achieve the electromagnetic function of the rotor in the motor.

In an exemplary embodiment, the cross section of the rotor core 102 is a ring shape, the entirety of the rotor core 102 is a cylindrical shape; through disposing the number of permanent magnet slots 103 to be an even number, the rotor core 102 can be divided into the same number of sector regions; it can be understood that the permanent magnet slots 103 can be disposed uniformly in the rotor core 102 around the axis, the two circumferential sides of each sector region are respectively provided with one permanent magnet slot 103, and this helps the assembling of the permanent magnets 104 on the one hand and helps the integral processing and assembling on the other hand.

As shown in FIGS. 1-5, a rotor structure 100 proposed by the embodiment comprises a rotor core 102 and the permanent magnets 104 disposed in the rotor core 102, so that the rotor structure 100 is driven under the magnetic action of the permanent magnets 104, and can rotate with respect to a stator 202, to achieve the normal operation of a motor. In an embodiment, permanent magnet slots 103 which pass through two end surfaces are provided in the rotor core 102, the permanent magnets 104 can be positioned within the permanent magnet slots 103, which can help drive the permanent magnets 104 by a magnetic force. The magnetic barriers 106 are further placed on the rotor core 102, through setting that the extending directions of the two ends of the magnetic barrier 106 face the permanent magnet 104 and the outer edge, the magnetic barriers 106 can be used as a structure for relieving the degree of magnetic saturation, and the magnetic barriers are formed in the rotating process of the rotor structure 100, to improve the power density and torque density of the motor, improve the overload capacity of the motor, effectively improve the torque ripple of the motor, and greatly improve the performance of the motor. Therefore, on the basis of decreasing the amount of the permanent magnets of the motor (i.e., decreasing the production costs), the cost-effectiveness and product-competitiveness of the motor adopting the rotor structure can be improved.

For the rotor structure 100 according to the present solution, on the one hand, the quadrature axis armature reaction of the motor is effectively suppressed, the degree of magnetic saturation is relieved and the load counter-electromotive force is reduced, and the torque density and the overload capacity of the motor are improved; on the other hand, the rotor core 102 is hollowed to form the magnetic barriers 106, and thus, the amount of rare earth permanent magnets 104 can further be reduced.

A plurality of permanent magnet slots 103 can be provided. Generally, the plurality of permanent magnet slots 103 are provided uniformly around the axis of the rotor core 102.

The extending direction of the permanent magnet slots 103 can be the axial direction of the rotor core 102, and can further be a direction which forms a certain angle with the axial direction, and apparently, out of the consideration of the processing costs and the processing difficulty, generally, the permanent magnet slots 103 only need to be disposed along the axial direction and pass through the two end surfaces of the rotor core 102.

It can be understood that for the rotor core 102, the permanent magnet slots 103 and the circumferential edge of the rotor core 102 are located at two directions, and thus the magnetic barriers 106 themselves will have certain bending through setting that the two ends of the magnetic barriers 106 respectively face the permanent magnets 104 and the outer edge of the rotor core 102.

The magnetic barrier 106 mainly comprises two parts, which are respectively a first slot segment 1062 and a second slot segment 1064. The first slot segment 1062 communicates with the second slot segment 1064. The ends of the first slot segment 1062 and the second slot segment 1064, which deviate from each other, face the permanent magnet slot 103 and the circumferential edge of the rotor core 102, respectively. The two parts of the magnetic barrier 106 respectively face the structures of different positions, and the two parts need to communicate with each other. Under the joint action of the two parts, suppression of the quadrature axis armature reaction of the motor can be achieved effectively, and thus the degree of magnetic saturation is relieved.

Furthermore, through setting the extending directions of the first slot segment 1062 and the second slot segment 1064, under the action of the magnet barriers, the quadrature axis armature reaction of the motor can be suppressed effectively, and the degree of magnetic saturation can be relieved effectively, to improve the power density and the torque density of the motor, the overload capacity of the motor and the torque ripple of the motor. In an embodiment, the cross section of the rotor core 102 is the normal plane of the axis of the rotor core 102, in the cross section, the rotor core is divided into 2P sector regions by the plurality of permanent magnet slots, and the angle between the extending direction of the first slot segment and the extending direction of the permanent magnet slots is [(180°/2P), 90°]. Apparently, in the cross section, the extending direction of the second slot segment 1064 and the rotation direction of the rotor core 102 can be orthogonal or approximately orthogonal, and the angle range therebetween can be [60°, 120°].

In an exemplary embodiment, the first slot segment 1062 communicates with the second slot segment 1064, the processing difficulty and processing costs can be reduced by setting that the transition between the first slot segment 1062 and the second slot segment 1064 is relatively smooth.

It can be understood that the smooth transition between the first slot segment 1062 and the second slot segment 1064 is a curve transition; when a certain included angle is formed between the first slot segment 1062 and the second slot segment 1064, if the slot widths of the two slot segments are the same, it can be a circular arc transition.

In an exemplary embodiment, the cross section of the permanent magnet slots is a polygonal shape, the polygonal permanent magnet slots can better help occupy the space of the rotor core, i.e., the space of the core inside the rotor can be fully used, so that the torque density is optimized. The polygonal shape starts from the radial outer side to radial inner side of the rotor, the magnetization direction presents a narrow-wide-narrow structure, the width of the narrow portion is w1, the width of the wide portion is w2, and the relation satisfies: $w2 \geq w1$.

As shown in FIGS. 1-5, a rotor structure 100 proposed by the embodiment comprises a rotor core 102 and permanent magnets 104 disposed in the rotor core 102, so that the rotor structure 100 is driven under the magnetic action of the permanent magnets 104, and can rotate with respect to a stator 202, to achieve the normal operation of a motor. In an embodiment, permanent magnet slots 103 which pass through two end surfaces are provided in the rotor core 102, the permanent magnets 104 can be positioned within the permanent magnet slots 103, which can help drive the permanent magnets 104 by a magnetic force. The magnetic barriers 106 are further placed on the rotor core 102; and through setting that the extending directions of the two ends of the magnetic barrier 106 face the permanent magnet 104 and the outer edge, the magnetic barriers 106 can be used as a structure for relieving the degree of magnetic saturation, and the magnetic barriers are formed in the rotating process of the rotor structure 100. Thus, the power density and torque density of the motor can be improved, the overload capacity of the motor can be improved, the torque ripple of the motor can be effectively improved, and the performance of the motor can be significantly improved. Thus, the cost-effectiveness and product-competitiveness of the motor which uses the rotor structure 100 can be improved, on the basis of decreasing the amount of the permanent magnets of the motor, i.e., decreasing the production costs.

The magnetic barrier 106 mainly comprises two parts, which are respectively a first slot segment 1062 and a second slot segment 1064. The first slot segment 1062 communicates with the second slot segment 1064. The ends of the first slot segment 1062 and the second slot segment 1064, which deviate from each other, face the permanent magnet slot 103 and the circumferential edge of the rotor core 102, respectively. The two parts of the magnetic barrier 106 respectively face the structures of different positions, and the two parts need to communicate with each other. Under the joint action of the two parts, suppression of the quadrature axis armature reaction of the motor can be achieved effectively, and thus the degree of magnetic saturation is relieved.

For the first slot segment 1062, in an embodiment, the end of first slot segment 1062 facing the permanent magnet slot 103 is directly communicated to the permanent magnet slot 103. During processing, it can be cut directly from the side of the permanent magnet slot 103 to extend into the rotor core 102, and this helps the processing. For the structure, the first slot segment 1062 is directly communicated to the permanent magnet slot 103, to achieve the effect of suppressing the quadrature axis armature reaction of the motor.

In another embodiment, the end of first slot segment 1062 facing the permanent magnet slot 103 does not communicate with the permanent magnet slot 103, i.e., there is a certain distance therebetween, and for the entirety of the magnet barrier 106, one end is a closed structure, and as for the structure, there is a certain gap between the first slot segment 1062 and the permanent magnet slot 103, and this can further achieve the effect of suppressing the quadrature axis armature reaction of the motor.

The first distance between the first slot segment 1062 and the permanent magnet slot 103 is greater than or equal to 0.2 mm.

For the second slot segment 1064, in an embodiment, the end of the second slot segment 1064 facing the circumferential edge is directly communicated to the circumferential edge. During the processing, it is directly cut from the outer side of the rotor core 102 to extend into the rotor core 102, and this helps the processing. For the structure, the second slot segment 1064 is directly communicated to the circumferential edge, to achieve the effect of suppressing the quadrature axis armature reaction of the motor.

In another embodiment, the end of the second slot segment 1064 facing the circumferential edge does not communicate with the circumferential edge, i.e., there is a certain distance therebetween, and for the entirety of the magnet barrier 106, one end is a closed structure, and as for the structure, there is a certain gap between the second slot segment 1064 and the circumferential edge, and this can further achieve the effect of suppressing the quadrature axis armature reaction of the motor.

The second distance between the second slot segment 1064 and the circumferential edge is greater than or equal to 0.2 mm.

It needs to be emphasized that the communicating relations between both of the first slot segment 1062 and the second slot segment 1064 and both of the permanent magnet slots 103 and the circumferential edge have four combinations, which are described as follow: the first slot segment 1062 is communicated, and the second slot segment 1064 is not communicated; the first slot segment 1062 is communicated, and the second slot segment 1064 is communicated; the first slot segment 1062 is not communicated, and the second slot segment 1064 is communicated; the first slot segment 1062 is not communicated, and the second slot segment 1064 is not communicated.

During the communication, q-axis inductance can be effectively reduced, the quadrature axis armature reaction of the motor is suppressed, core saturation is relieved; when they are not in communication, the structure strength of the rotor can be ensured.

There are multiple permanent magnet slots 103 provided in the rotor core 102, the communicating relations of the first slot segment 1062 and the second slot segment 1064 of each permanent magnet slot 103 are independent, and thus, they can be selected and disposed flexibly according to actual needs.

In an exemplary embodiment, in the plurality of magnet barriers disposed corresponding to the same permanent magnet, the communicating relations between the first slot segments and the permanent magnet slot are consistent, and the communicating relations between the second slot segments and the outer edge of the rotor core are consistent. For the plurality of magnetic barriers disposed corresponding to the same permanent magnet slot, through setting that the connecting relations between the first slot segments and the permanent magnet slot and the connecting relations between the second slot segments and the outer edge of the rotor core are respectively consistent, the processing efficiency is improved.

In an exemplary embodiment, in the plurality of magnet barriers disposed corresponding to the same permanent magnet, the communicating relations between the first slot segments of at least two adjacent magnetic barriers and the permanent magnet slot are inconsistent, and the communicating relations between the second slot segments and the outer edge of the rotor core are inconsistent. For the plurality of magnetic barriers disposed corresponding to the same permanent magnet slot, the communicating relations of the first slot segments and the second slot segments are staggered, it can be understood that there will be a relatively great armature suppression effect if the first slot segments communicate with the permanent magnet slot, but the strength will be affected in a certain degree due to a direct breaking design, if the first slot segments do not communicate with the permanent magnet slot, a certain strength will be obtained, but the effect of suppressing the armature will be relatively weak; the communicating relations between the second slot segments and the outer edge are in the same way, through the staggered communicating relations, the armature suppression effect and the strength can be improved comprehensively, and the use feasibility of the rotor structure is improved.

In an exemplary embodiment, in the plurality of magnet barriers disposed corresponding to the same permanent magnet, the first slot segment of at least one magnetic barrier does not communicate with the permanent magnet slot, and the second slot segment does not communicate with the outer edge of the rotor core. For the plurality of magnetic barriers disposed corresponding to the same permanent magnet slot, through setting that the first slot segments and the second slot segments of the magnetic barriers respectively do not communicate with the permanent magnet slot and the outer edge, it can be understood that the structure strength of the rotor core in the operating process can be improved effectively as the two ends do not communicate, and thus the integral stability of the overall rotor structure in rotating is improved.

In an exemplary embodiment, both the first slot segment and the second slot segment are straight line segments, which facilitates the processing of the slot segments. Through setting that the angle between the two straight line segments is as [60°,120°], the suppressing effect of the quadrature axis armature reaction can be facilitated.

In another embodiment, it can further be limited that one of the first slot segment and the second slot segment presents a curved line shape, or both of them present a curved line shape.

As shown in FIGS. 1-5, a rotor structure 100 proposed by the embodiment comprises a rotor core 102 and permanent magnets 104 disposed in the rotor core 102, so that the rotor structure 100 is driven under the magnetic action of the permanent magnets 104, and can rotate with respect to a stator 202, to achieve the normal operation of a motor. In an embodiment, permanent magnet slots 103 which pass through two end surfaces are provided in the rotor core 102, the permanent magnets 104 can be positioned within the permanent magnet slots 103, which can help drive the permanent magnets 104 by a magnetic force. Magnetic barriers 106 are further placed on the rotor core 102; and through setting that the extending directions of the two ends of the magnetic barrier 106 face the permanent magnet 104 and the outer edge, the magnetic barriers 106 can be used as a structure for relieving the degree of magnetic saturation, and the magnetic barriers are formed in the rotating process of the rotor structure 100. Thus, the power density and torque density of the motor can be improved, the overload capacity of motor can be improved, the torque ripple of the motor can be effectively improved, and the performance of the motor can be significantly improved. Thus, the cost-effectiveness and product-competitiveness of the motor which uses the rotor structure 100 can be improved, on the basis of decreasing the amount of the permanent magnets of the motor, i.e., decreasing the production costs.

For the rotor structure 100 according to the present solution, on the one hand, the quadrature axis armature reaction of the motor is effectively suppressed, the degree of magnetic saturation is relieved and the load counter-electromotive force is reduced, and the torque density and the overload capacity of the motor are improved; on the other hand, the rotor core 102 is hollowed to form magnetic barriers 106, and thus, the amount of rare earth permanent magnets 104 can further be reduced.

For a structure that the magnetic barriers are provided at both sides in the magnetization direction, the communicating methods of the two ends of the magnetic barrier are diversified, and the details are shown in FIGS. 1 and 6-11.

As shown in FIG. 1, there are three magnetic barriers respectively at the two sides of the permanent magnet slot, but the present disclosure is not limited to three magnetic barriers. The three magnetic barriers do not communicate with the permanent magnet slot, and do not communicate with the air gap at the radial outer side of each sector region of the rotor core. None of the magnetic barriers at the two sides of each permanent magnet slot communicates with the permanent magnet slot, at the radial outer side of each sector region of the rotor core, none of the magnetic barriers communicates with the air gap.

Figure 6:
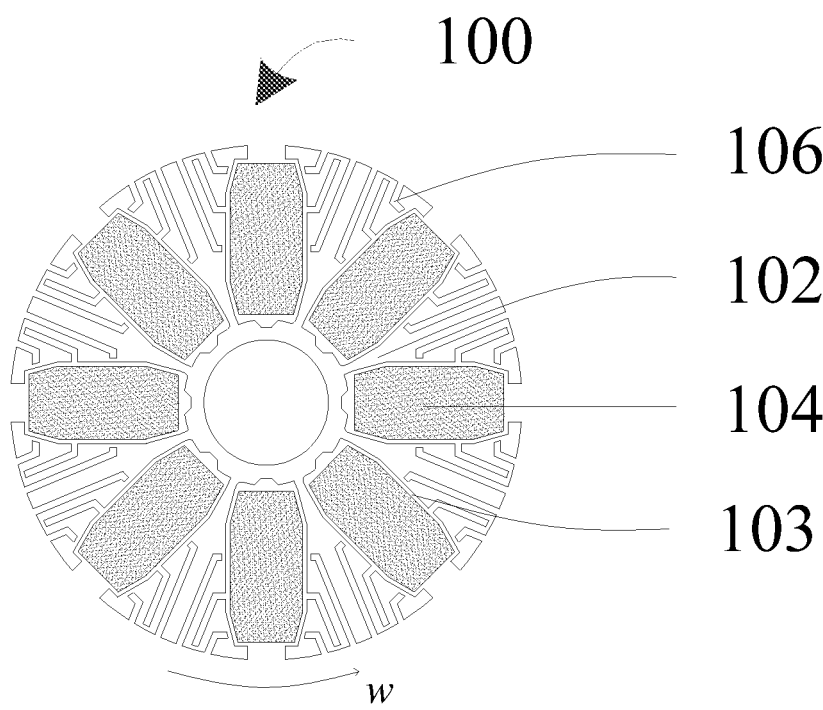
FIG. 6 shows a schematic view of the structure of a rotor structure according to an embodiment of the present disclosure.

As shown in FIG. 6, there are three magnetic barriers respectively at the two sides of the permanent magnet slot, but the present disclosure is not limited to three magnetic barriers. One magnetic barrier communicates with the permanent magnet slot, the other two magnet barriers communicate with the air gap at the radial outer side of each sector region of the rotor core. At least one magnetic barrier communicates with the permanent magnet slot respectively at the two sides of each permanent magnet slot, and at the radial outer side of each sector region of the rotor core, at least one magnetic barrier communicates with the air gap.

Figure 7:
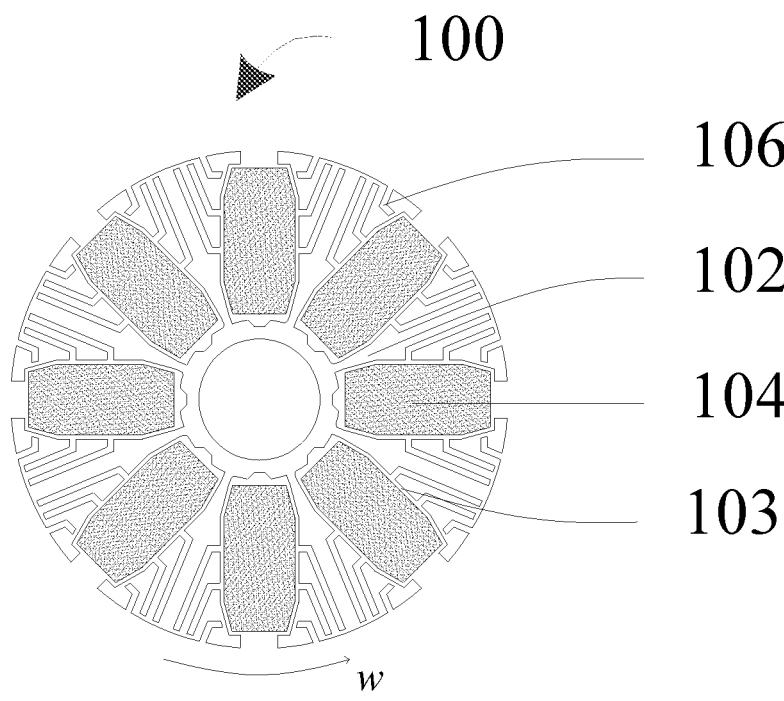
FIG. 7 shows a schematic view of the structure of a rotor structure according to an embodiment of the present disclosure.

As shown in FIG. 7, there are three magnetic barriers respectively at the two sides of the permanent magnet slot, but the present disclosure is not limited to three magnetic barriers. Two magnetic barriers communicate with the permanent magnet slot, and one magnet barrier communicates with the air gap at the radial outer side of each sector region of the rotor core. At least one magnetic barrier communicates with the permanent magnet slot respectively at the two sides of each permanent magnet slot, and at the radial outer side of each sector region of the rotor core, at least one magnetic barrier communicates with the air gap.

Figure 8:
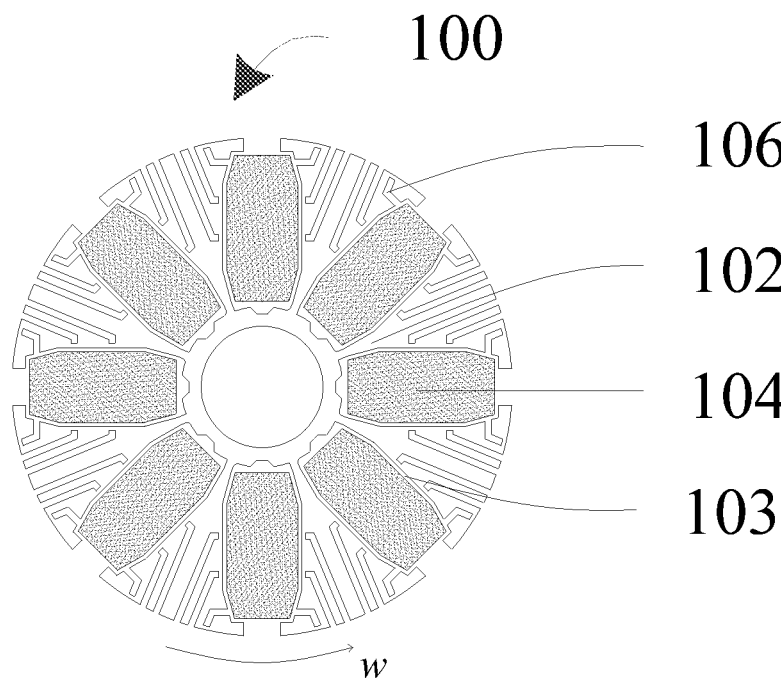
FIG. 8 shows a schematic view of the structure of a rotor structure according to an embodiment of the present disclosure.

As shown in FIG. 8, there are three magnetic barriers respectively at the two sides of the permanent magnet slot, but the present disclosure is not limited to three magnetic barriers. One magnetic barrier communicates with the permanent magnet slot, the other two magnet barriers communicate with the air gap at the radial outer side of each sector region of the rotor core. At least one magnetic barrier communicates with the permanent magnet slot respectively at the two sides of each permanent magnet slot, and at the radial outer side of each sector region of the rotor core, at least one magnetic barrier communicates with the air gap.

Figure 9:
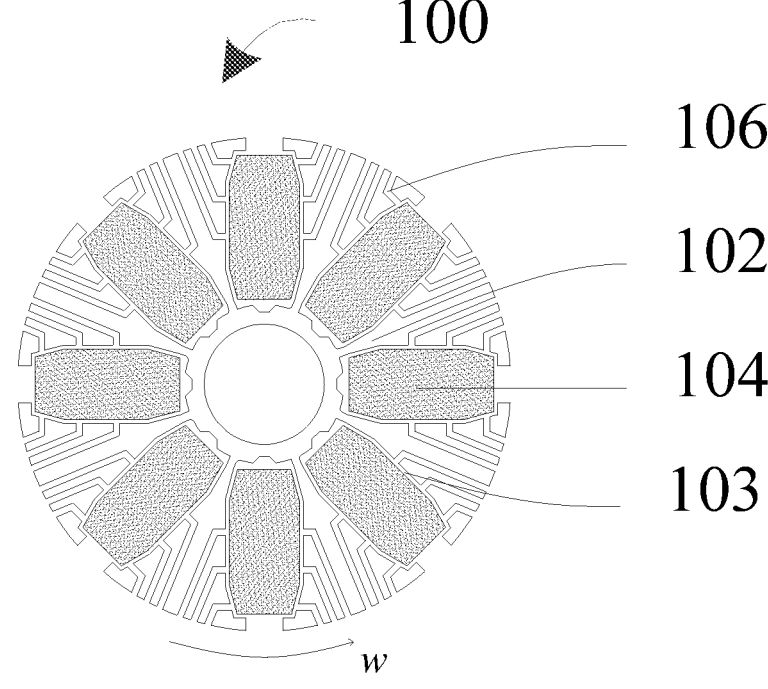
FIG. 9 shows a schematic view of the structure of a rotor structure according to an embodiment of the present disclosure.

As shown in FIG. 9, there are three magnetic barriers respectively at the two sides of the permanent magnet slot, but the present disclosure is not limited to three magnetic barriers. The three magnetic barriers communicate with the permanent magnet slot, and communicate with the air gap at the radial outer side of each sector region of the rotor core. At least one magnetic barrier communicates with the permanent magnet slot respectively at the two sides of each permanent magnet slot, and at the radial outer side of each sector region of the rotor core, at least one magnetic barrier communicates with the air gap.

Figure 10:
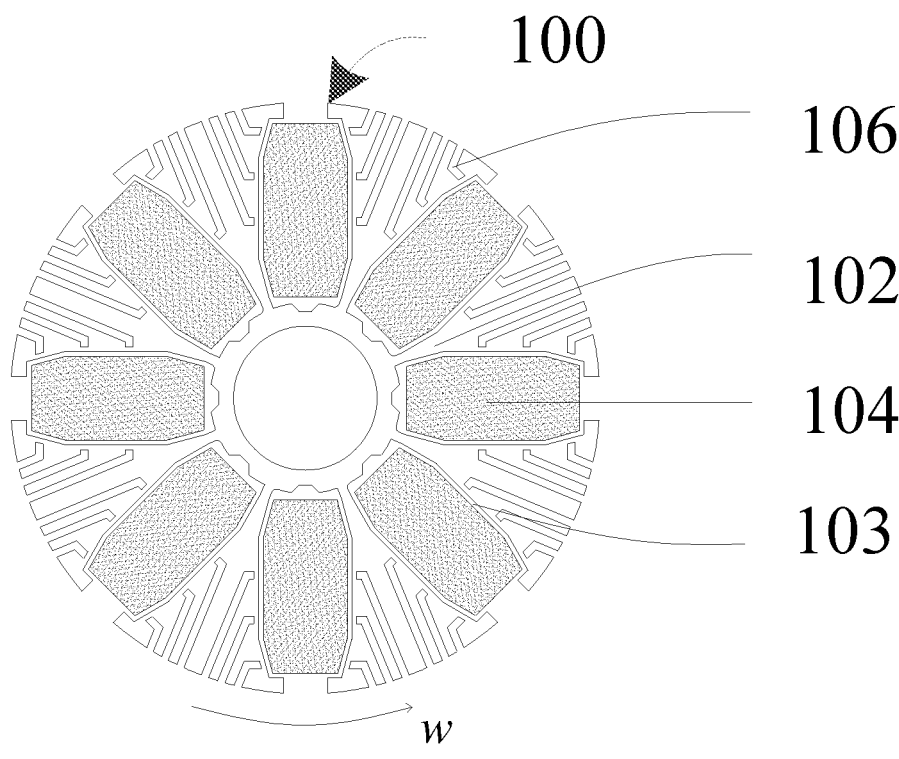
FIG. 10 shows a schematic view of the structure of a rotor structure according to an embodiment of the present disclosure.

As shown in FIG. 10, there are three magnetic barriers respectively at the two sides of the permanent magnet slot, but the present disclosure is not limited to three magnetic barriers. The three magnetic barriers do not communicate with the permanent magnet slot, and the three magnetic barriers communicate with the air gap at the radial outer side of each sector region of the rotor core. At least one magnetic barrier does not communicate with the permanent magnet slot respectively at the two sides of each permanent magnet slot, and at the radial outer side of each sector region of the rotor core, at least one magnetic barrier communicates with the air gap.

Figure 11:
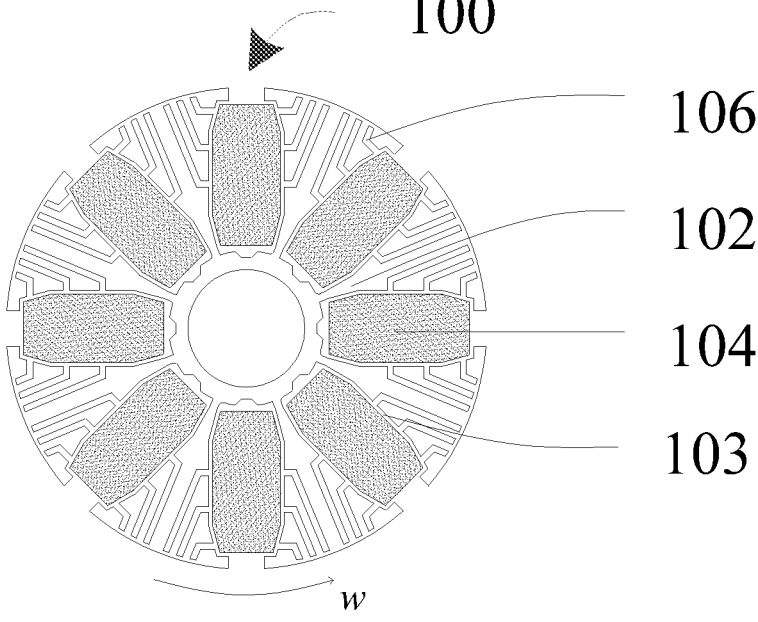
FIG. 11 shows a schematic view of the structure of a rotor structure according to an embodiment of the present disclosure.

As shown in FIG. 11, there are three magnetic barriers respectively at the two sides of the permanent magnet slot, but the present disclosure is not limited to three magnetic barriers. The three magnetic barriers communicate with the permanent magnet slot, and the three magnetic barriers do not communicate with the air gap at the radial outer side of each sector region of the rotor core. At least one magnetic barrier communicates with the permanent magnet slot respectively at the two sides of each permanent magnet slot, and at the radial outer side of each sector region of the rotor core, at least one magnetic barrier does not communicate with the air gap.

In addition, for a structure that the magnetic barriers are only provided at the weak magnetic side in the magnetization direction, the communicating methods of the two ends of the magnetic barrier are further diversified.

Figure 12:
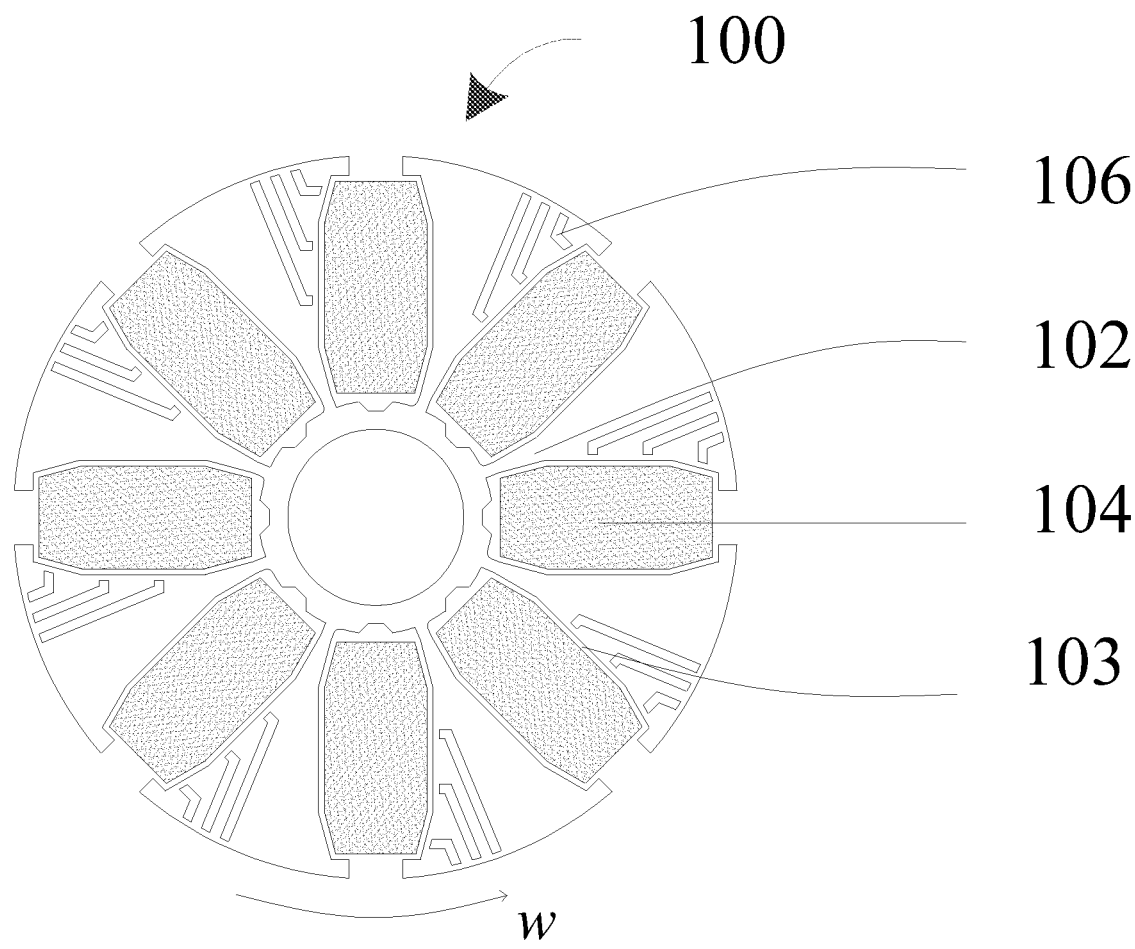
FIG. 12 shows a schematic view of the structure of a rotor structure according to an embodiment of the present disclosure.

As shown in FIG. 12, the motor rotates along the counterclockwise direction, three magnetic barriers are disposed beside the permanent magnet slot along the counter-clockwise rotating direction of the motor, but the present disclosure is not limited to three magnetic barriers. The three magnetic barriers do not communicate with the permanent magnet slot, and do not communicate with the air gap at the radial outer side of each sector region of the rotor core. None of the magnetic barriers at the two sides of each permanent magnet slot communicates with the permanent magnet slot, at the radial outer side of each sector region of the rotor core, none of the magnetic barriers communicates with the air gap.

Figure 13:
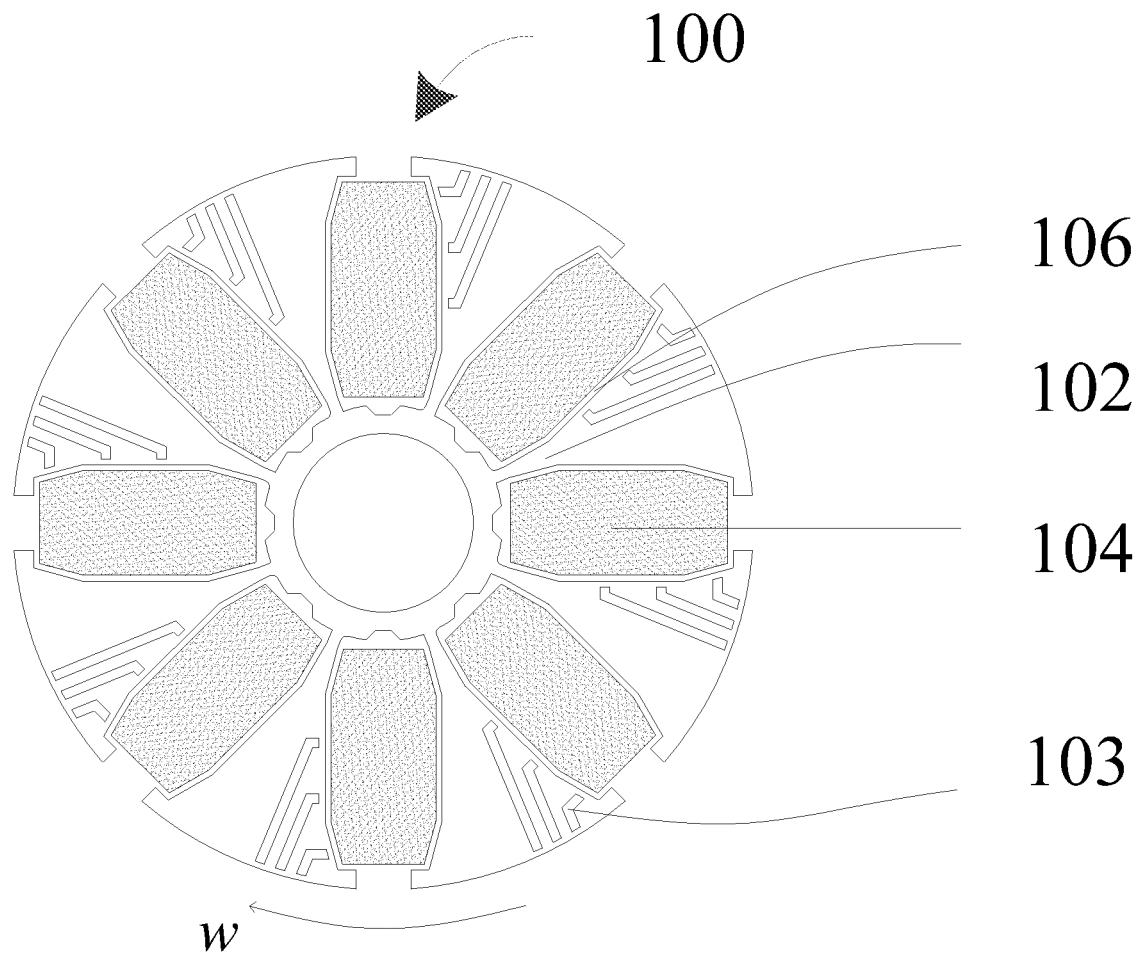
FIG. 13 shows a schematic view of the structure of a rotor structure according to an embodiment of the present disclosure.
Figure 14:
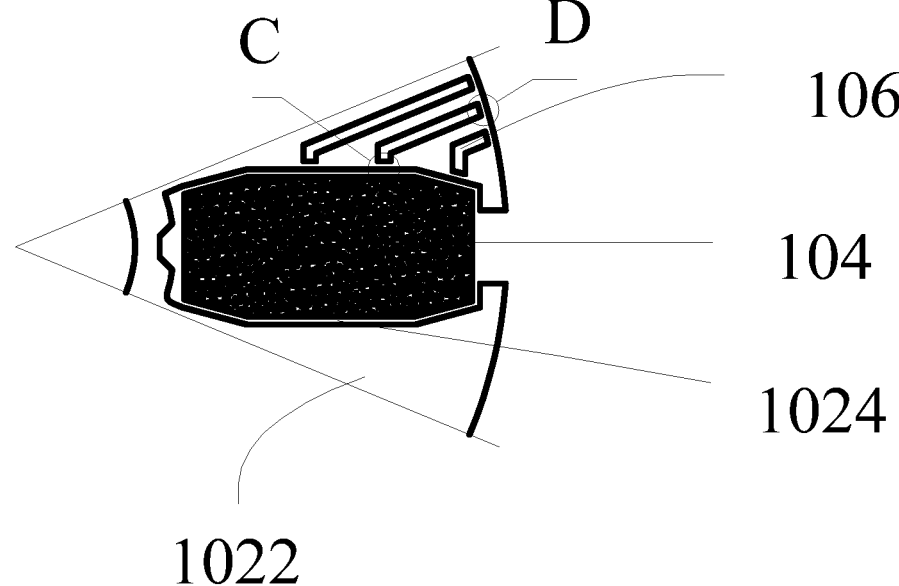
FIG. 14 shows a schematic view of the structure of a rotor structure according to an embodiment of the present disclosure.
Figure 15:
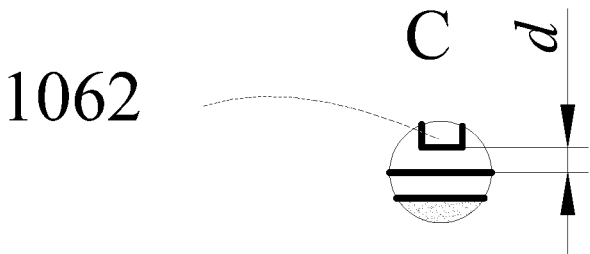
FIG. 15 shows a partially enlarged schematic view of portion C in FIG. 14.
Figure 16:
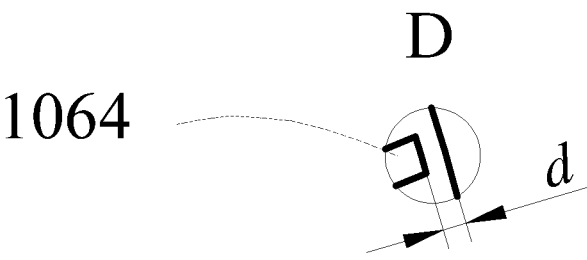
FIG. 16 shows a partially enlarged schematic view of portion D in FIG. 14.

As shown in FIG. 13, the motor rotates along the clockwise direction, three magnetic barriers are disposed beside the permanent magnet slot along the clockwise rotating direction of the motor, but the present disclosure is not limited to three magnetic barriers. The three magnetic barriers do not communicate with the permanent magnet slot, and do not communicate with the air gap at the radial outer side of each sector region of the rotor core. None of the magnetic barriers at the two sides of each permanent magnet slot communicates with the permanent magnet slot, at the radial outer side of each sector region of the rotor core, none of the magnetic barriers communicates with the air gap.

Figure 17:
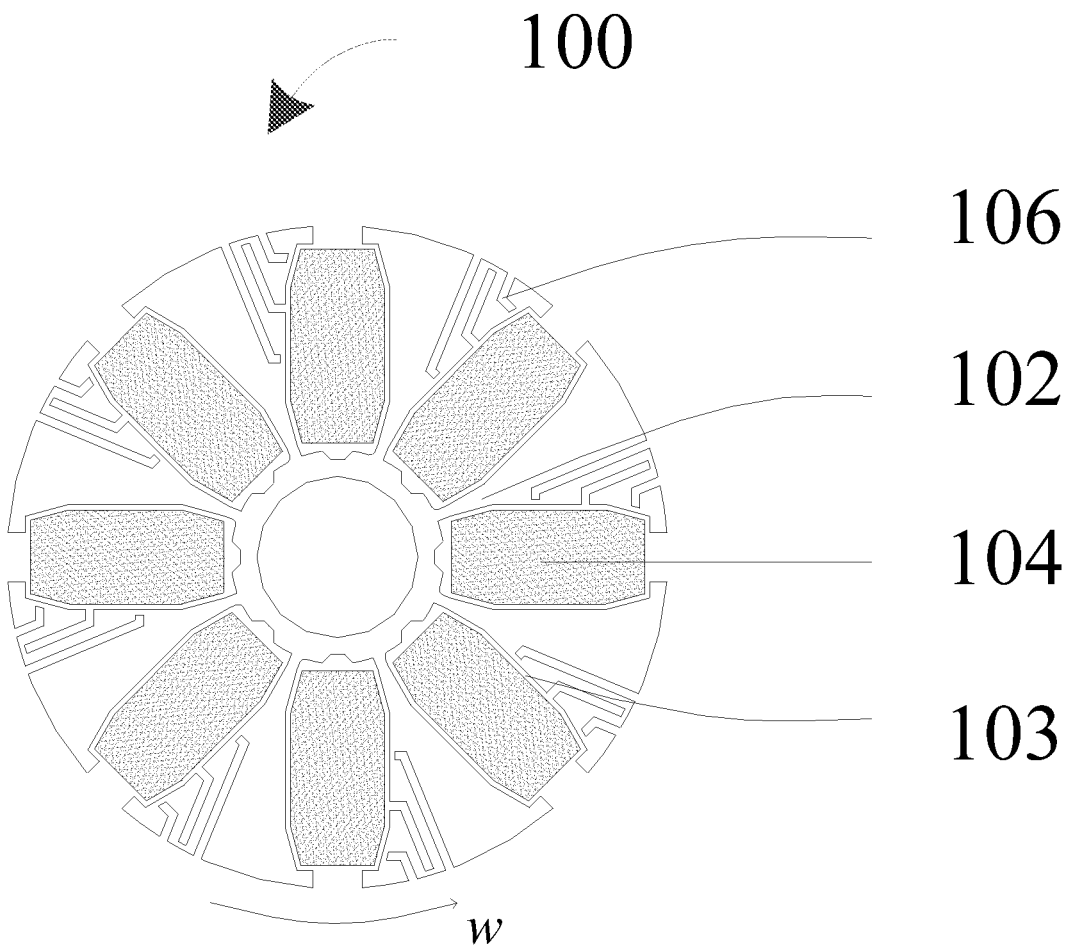
FIG. 17 shows a schematic view of the structure of a rotor structure according to an embodiment of the present disclosure.

As shown in FIG. 17, the motor rotates along the counter-clockwise direction, three magnetic barriers are disposed beside the permanent magnet slot along the counter-clockwise rotating direction of the motor, but the present disclosure is not limited to three magnetic barriers. One magnetic barrier communicates with the permanent magnet slot, the other two magnet barriers do not communicate with the air gap at the radial outer side of each sector region of the rotor core. At least one magnetic barrier communicates with the permanent magnet slot, and at the radial outer side of each sector region of the rotor core, at least one magnetic barrier communicates with the air gap.

Figure 18:
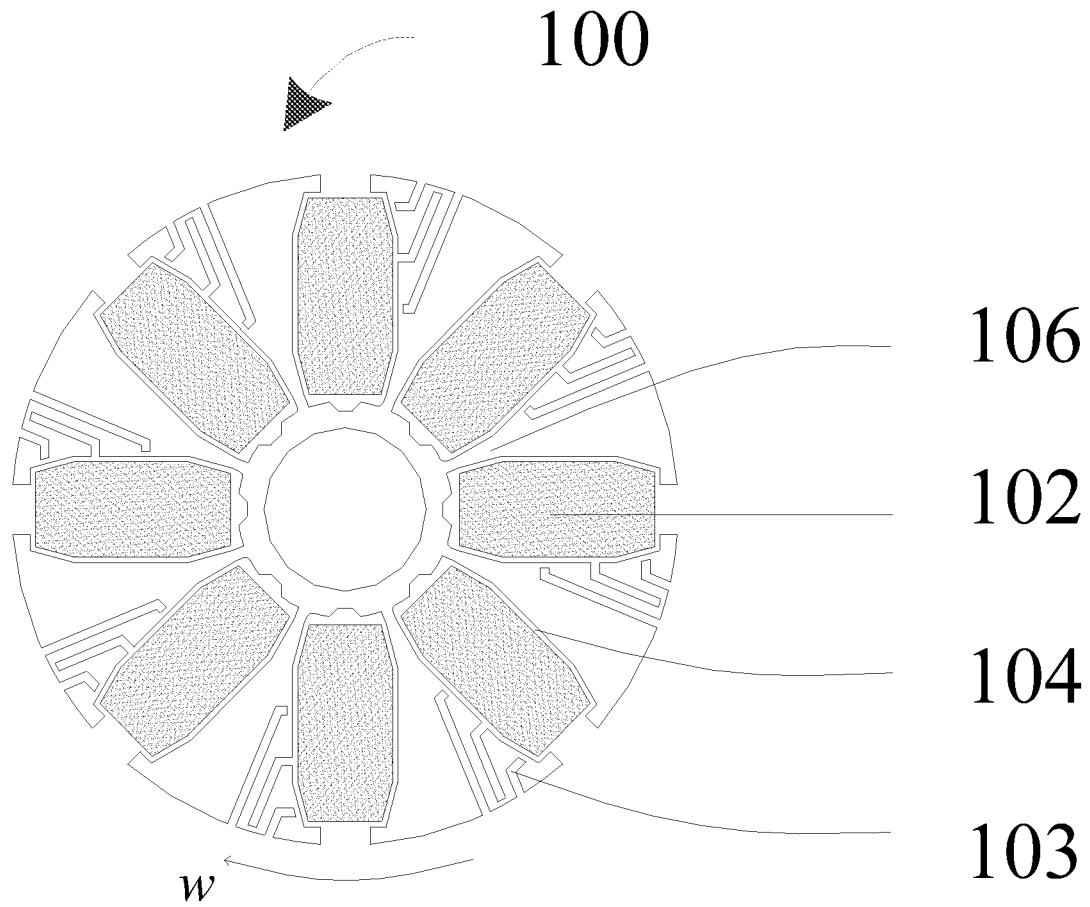
FIG. 18 shows a schematic view of the structure of a rotor structure according to an embodiment of the present disclosure.

As shown in FIG. 18, the motor rotates along the clockwise direction, three magnetic barriers are disposed beside the permanent magnet slot along the counter-clockwise rotating direction of the motor, but the present disclosure is not limited to three magnetic barriers. One magnetic barrier communicates with the permanent magnet slot, the other two magnet barriers do not communicate with the air gap at the radial outer side of each sector region of the rotor core. At least one magnetic barrier communicates with the permanent magnet slot, and at the radial outer side of each sector region of the rotor core, at least one magnetic barrier communicates with the air gap.

Figure 19:
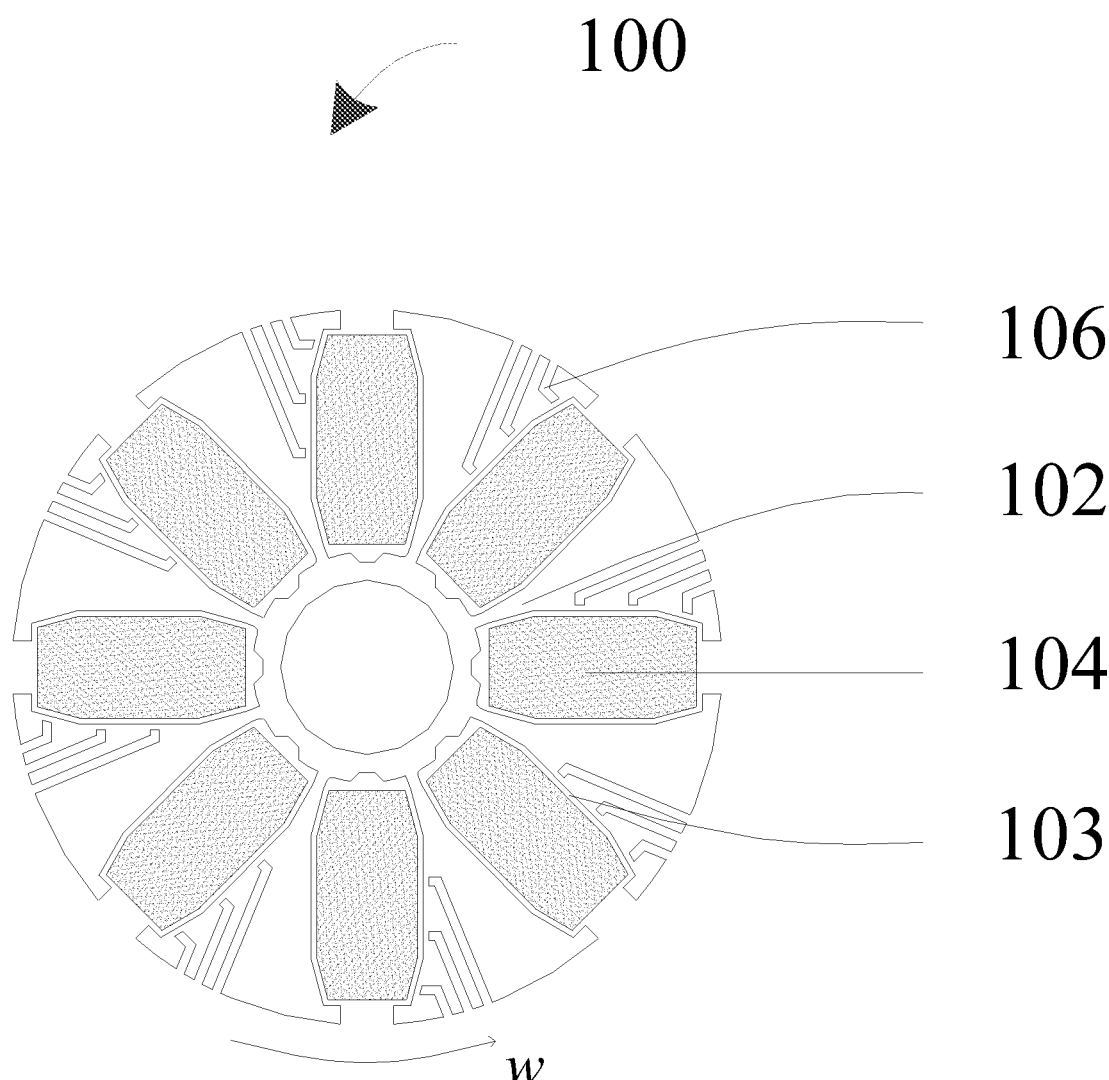
FIG. 19 shows a schematic view of the structure of a rotor structure according to an embodiment of the present disclosure.

As shown in FIG. 19, the motor rotates along the counter-clockwise direction, three magnetic barriers are disposed beside the permanent magnet slot along the counter-clockwise rotating direction of the motor, but the present disclosure is not limited to three magnetic barriers. The three magnetic barriers do not communicate with the permanent magnet slot, and the three magnetic barriers communicate with the air gap at the radial outer side of each sector region of the rotor core. At least one magnetic barrier communicates with the permanent magnet slot respectively, and at the radial outer side of each sector region of the rotor core, at least one magnetic barrier does not communicate with the air gap; or at least one magnetic barrier does not communicate with the permanent magnet slot respectively at the two sides of each permanent magnet slot, and at the radial outer side of each sector region of the rotor core, at least one magnetic barrier communicates with the air gap.

Figure 20:
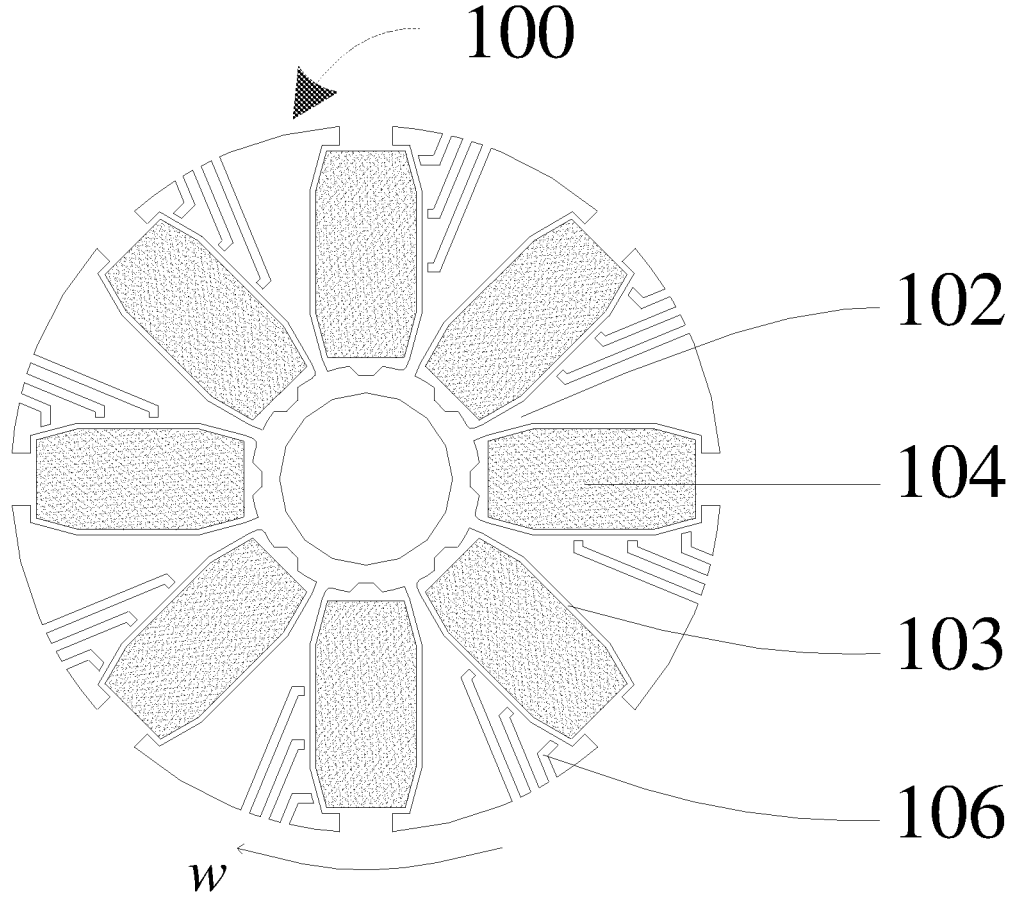
FIG. 20 shows a schematic view of the structure of a rotor structure according to an embodiment of the present disclosure.

As shown in FIG. 20, the motor rotates along the clockwise direction, three magnetic barriers are disposed beside the permanent magnet slot along the clockwise rotating direction of the motor, but the present disclosure is not limited to three magnetic barriers. The three magnetic barriers do not communicate with the permanent magnet slot, and the three magnetic barriers communicate with the air gap at the radial outer side of each sector region of the rotor core. At least one magnetic barrier communicates with the permanent magnet slot respectively, and at the radial outer side of each sector region of the rotor core, at least one magnetic barrier does not communicate with the air gap; or at least one magnetic barrier does not communicate with the permanent magnet slot respectively at the two sides of each permanent magnet slot, and at the radial outer side of each sector region of the rotor core, at least one magnetic barrier communicates with the air gap.

Figure 21:
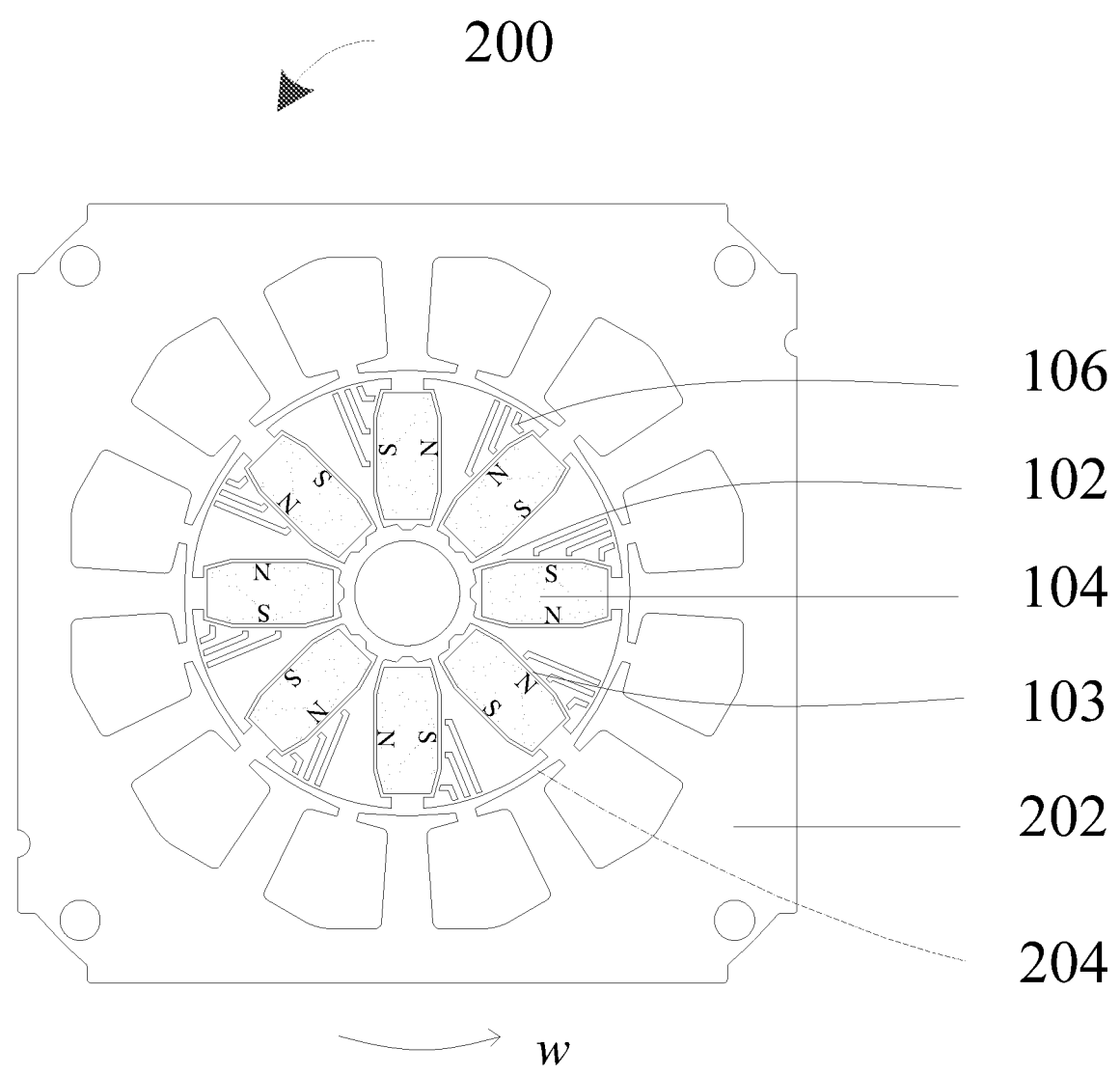
FIG. 21 shows a schematic view of the structure of a motor structure according to an embodiment of the present disclosure.
Figure 22:
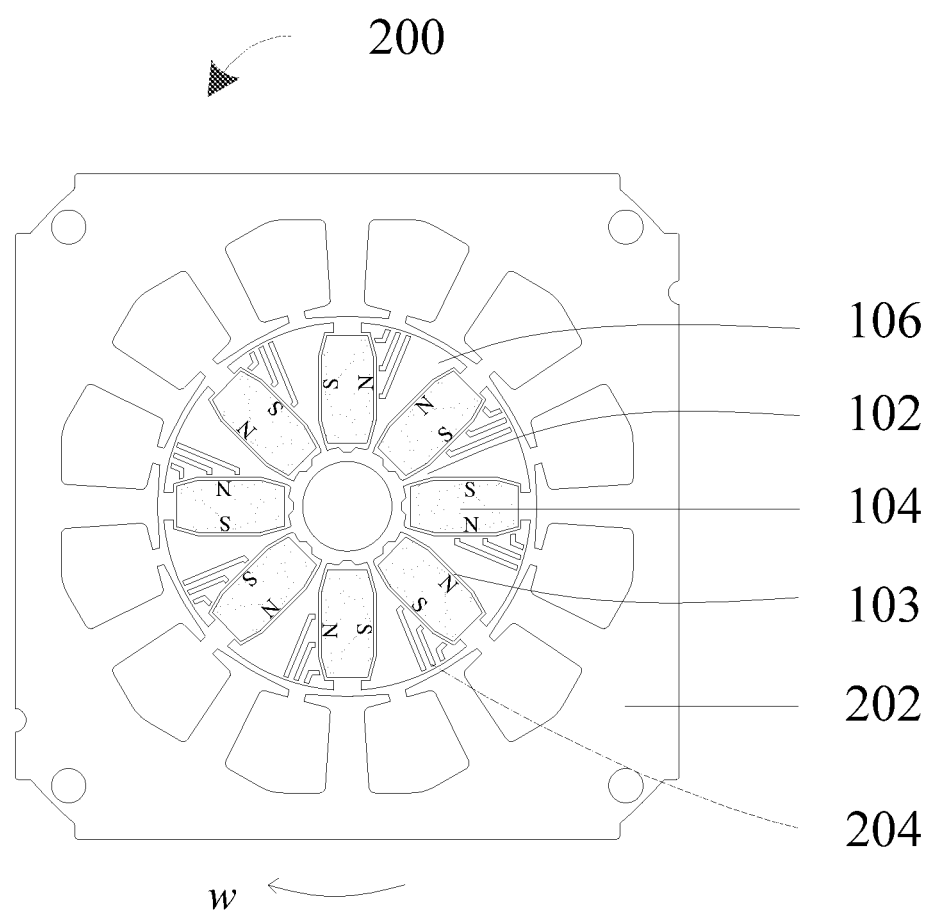
FIG. 22 shows a schematic view of the structure of a motor structure according to an embodiment of the present disclosure.

As shown in FIGS. 21 and 22, the embodiment proposes a motor structure 200, comprising: a stator 202 and a rotor structure 100. The rotor structure 100 can rotate with respect to the stator 202. The motor structure 200 is provided with the rotor structure 100 in any of the above embodiments, and thus has the beneficial effects of any of the above rotor structures, which will not be repeated herein.

It needs to be emphasized that, since the motor structure 200 comprises the above rotor structure 100, on the one hand, the motor structure effectively suppresses the quadrature axis armature reaction of the motor, relieves the degree of magnetic saturation and reduces the load counter-electromotive force, and improves the torque density and overload capacity of the motor, on the other hand, it can further weaken the magnetic field harmonics of the rotor in the air gap 204 and improve the torque ripple of the motor.

Figure 23:
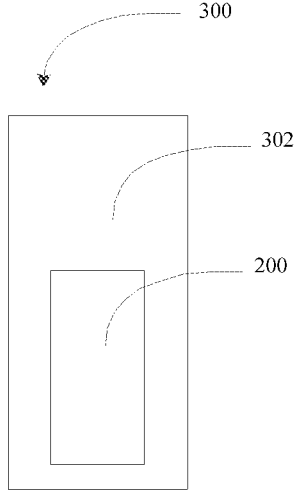
FIG. 23 shows a schematic view of the structure of a laundry treatment device according to an embodiment of the present disclosure.

As shown in FIG. 23, a laundry treatment device 300 proposed in the embodiment comprises a housing 302 and a motor structure 200 disposed in the housing 302, and the motor structure 200 is provided in the housing 302 in the above Embodiment 5, and thus has the beneficial effects of any of the above motor structures 200, which will not be repeated herein.

The present disclosure further proposes a rotor, to suppress the quadrature axis armature reaction of the motor, relieve the saturation of the core and improve the torque density and the overload capacity of the motor. The present disclosure proposes a rotor and its unidirectional rotation motor, comprising the permanent magnets and the rotor core. The rotor core comprises several permanent magnet slots arranged along the radial direction, and the permanent magnets are embedded in the permanent magnet slots. The rotor core is made by laminating silicon steel sheets, the magnetic barriers are provided beside the permanent magnet slots along the side of the rotation direction of the motor, and the two ends of the magnetic barriers respectively point at the permanent magnet slots and the peripheral edge of the punching sheets of the rotor core.

In order not to affect the permanent magnetic flux linkage, and in order to standardize the magnetic field line path, weaken the magnetic field harmonics in the air gap and improve the torque ripple of the motor, the extending direction of the end of the magnetic barrier which points at the peripheral edge of the punching sheet of the rotor core is orthogonal or approximately orthogonal to the operation direction of the rotor. Being approximately orthogonal herein indicates that the range of the included angle is between 60°~120°. The range of the angle between the extending direction of the end of the magnetic barrier which points at the permanent magnet slots and the permanent magnet slots is between $(180/2P)°$~90°.

In order to effectively reduce the q-axis inductance, suppress the quadrature axis armature reaction of the motor and relieve the saturation of the core when the magnetic barrier is conducted with the permanent magnet slots or the peripheral edge of the punching sheet of the rotor core, and in order to ensure the structure strength of the rotor when the magnetic barrier is not conducted with the permanent magnet slots or the peripheral edge of the punching sheet of the rotor core, each magnetic barrier does not communicate with at least one of the permanent magnet slots and the air gap at the radial outer side of each sector region of the rotor core, or all the magnetic barriers communicate with the permanent magnet slots and the air gap at the radial outer side of each sector region of the rotor core.

The structure strength of the rotor needs to be ensured, and meanwhile the q-axis inductance can be effectively reduced, the quadrature axis armature reaction of the motor is suppressed, and the saturation of the core is relieved. In a non-communication state, the distance between the magnetic barrier in the rotor core and the permanent magnet slots or the outer surface of the rotor is d, and d 0.2 mm.

In order to sufficiently use the space of the internal core of the rotor, the torque density is optimized. The shape of the permanent magnet slots is a centrally symmetric polygonal shape. The polygonal shape starts from the radial outer side to the radial inner side of the rotor, the magnetization direction presents a narrow-wide-narrow structure, the width of the narrow portion is w1, the width of the wide portion is w2, and the relation satisfies: w2≥w1.

According to an embodiment of the present disclosure, one end of the magnetic barrier 106 points at the permanent magnet slot 103 and the extending direction is orthogonal or approximately orthogonal to the permanent magnet slot 103, the other end points at the peripheral edge of the punching sheet 1022 of the rotor core 102 and the extending direction is orthogonal or approximately orthogonal to the operation direction of the rotor. Being approximately orthogonal herein indicates that the range of the included angle is between 60°~120°.

The present disclosure further proposes a unidirectional rotation motor, comprising: permanent magnets, a rotor and a stator core. A stator comprises the stator core and a stator winding, a plurality of stator convex teeth are provided on the stator core, the plurality of stator convex teeth are arranged around the central line of the stator core in the circumferential direction, and the stator winding is wounded around the plurality of stator convex teeth. The rotor comprises the rotor core, the rotor core comprises several permanent magnet slots arranged along the radial direction, and the rotor core is cut into 2P poles of sector regions by the permanent magnet slots.

According to an embodiment of the present disclosure, none of the magnetic barriers 106 at the two sides of each pole of the permanent magnet slots 103 communicate with the permanent magnet slots 103, and at least one magnetic barrier 106 communicates with the air gap 204 at the radial outer side of each sector region of the rotor core 102; or at least one magnetic barrier 106 communicates with the permanent magnet slots 103 respectively at the two sides of each pole of the permanent magnet slots 103, and none of the magnetic barriers 106 communicate with the air gap 204 at the radial outer side of each sector region of the rotor core 102.

If any end of the magnetic barrier 106 in the rotor core 102 is in a non-communicating state (it does not communicate with the permanent magnet slot 103 or the air gap 204), the distance between the end and the permanent magnet slot 103 or the surface of the peripheral edge of the rotor is d>0.2 mm.

The present embodiment can effectively improve the overload capacity of the motor and reduce the torque ripple and the costs of the motor only by designing multiple layers of quadrature axis magnetic barriers on the rotor core 102 and combining and designing the permanent magnets 104 by using at least one relatively cheap permanent magnet material.

According to the rotor structure, the motor structure and the laundry treatment device proposed in the present disclosure, on the one hand, on the basis of suppressing the quadrature axis armature reaction of the motor, relieving the degree of magnetic saturation and reducing the load counter-electromotive force, and improving the torque density and the overload capacity of the motor, the positions of the magnetic barriers can be configured according to the limiting of the rotation direction of the rotor structure; on the other hand, the rotor core is hollowed to form magnetic barriers, and thus, the amount of rare earth permanent magnets can further be reduced.

In the present disclosure, the terms of "first", "second" and "third" are used only for the purpose of description and shall not be understood to indicate or imply any relative importance; the term of "a plurality of" indicates two or more, unless otherwise explicitly specified or defined. The terms of "assembling", "connected with", "connected to", "fixing" and the like should be understood in a broad sense, for example, the term "connected to" may be a fixed connection, and may further be a removable connection, or an integral connection; and the term of "connected with" may be a direct connection and may further be an indirect connection through an intermediate medium. A person of ordinary skills in the art could understand the specific meanings of the terms in the present disclosure according to specific situations.

In the description of the present disclosure, it needs to be understood that the orientation or position relations indicated by the terms of "upper", "lower", "left", "right", "front", "rear" and the like are based on the orientation or position relations shown in the accompanying drawings, and they are just intended to conveniently describe the present disclosure and simplify the description, and are not intended to indicate or imply that the devices or units as indicated should have specific orientations or should be configured or operated in specific orientations, and then should not be construed as limitations to the present disclosure.

In the description of the present specification, the descriptions of the phrases "one embodiment", "some embodiments" and "specific embodiments" and the like mean that the specific features, structures, materials or characteristics described in combination with the embodiment(s) or example(s) are included in at least one embodiment or example of the present disclosure. In the specification, the schematic representation of the above phrases does not necessarily refer to the same embodiment or example. Moreover, the particular features, structures, materials or characteristics described may be combined in a suitable manner in any one or more of the embodiments or examples.

The descriptions above are only some embodiments of the present disclosure, and are not used to limit the present disclosure. For a person skilled in the art, the present disclosure may have various changes and variations. Any modifications, equivalent substitutions, improvements, etc. made within the spirit and principle of the present disclosure shall all be included in the protection scope of the present disclosure.

What is claimed is:

1. A rotor structure comprising:
    a rotor core having a plurality of permanent magnet slots arranged along a circumferential direction of the rotor core;
    a plurality of permanent magnets positioned within respective ones of the permanent magnet slots; and a plurality of magnetic barriers formed by the rotor core, wherein, for each permanent magnet slot:

one or more of the magnetic barriers are disposed on at least one side of the respective permanent magnet slot;

a first slot segment of at least one of the one or more magnetic barriers forms a straight-line shape that extends towards the respective permanent magnet slot; and a second slot segment of the at least one of the one or more magnetic barriers forms a straight-line shape that extends towards an outer edge of the rotor core.

2. The rotor according to claim 1, wherein a cross section of each of the permanent magnet slots forms a polygonal shape that is centrosymmetric.

3. The rotor according to claim 2, wherein:

each of the permanent magnet slots forms a first slot portion, a second slot portion, and a third slot portion;

the first slot portion, the second slot portion, and the third slot portion are connected along a radial direction of the rotor core; and a width of the first slot portion is less than or equal to a width of the second slot portion; and a width of the third slot portion is less than or equal to the width of the second slot portion.

4. The rotor according to claim 1, wherein:

the rotor is configured to rotate unidirectionally in a rotation direction; and the one or more magnetic barriers are provided at a leading side of the respective permanent magnet slot in the rotation direction.

5. The rotor according to claim 1, wherein:

the rotor core is divided into 2P sector regions by the permanent magnet slots;

an angle between an extending direction of the first slot segment and an extending direction of the respective permanent magnet slot is [(180°/2P), 90°]; and an angle between an extending direction of the second slot segment and a rotation direction of the rotor core is [60°, 120°].

6. The rotor according to claim 1, wherein an end of the first slot segment, which is away from the second slot segment, communicates with the respective permanent magnet slot.

7. The rotor according to claim 1, wherein an end of the first slot segment, which is away from the second slot segment, is separated from the respective permanent magnet slot by a first distance.

8. The rotor according to claim 7, wherein the first distance is greater than or equal to 0.2 mm.

9. The rotor according to claim 1, wherein an end of the second slot segment, which is away from the first slot segment, communicates with the outer edge of the rotor core.

10. The rotor according to claim 1, wherein an end of the second slot segment, which is away from the first slot segment, is separated from the respective permanent magnet slot by a second distance.

11. The rotor according to claim 10, wherein the second distance is greater than or equal to 0.2 mm.

12. The rotor according to claim 1, wherein:

the one or more magnetic barriers comprises a plurality of magnetic barriers disposed on at least one side of the respective permanent magnet slot;

each of the magnetic barriers comprises the first slot segment and the second slot segment;

communicating relations between the first slot segments and the permanent magnet slot are consistent between the magnetic barriers disposed on a side of the respective permanent magnet slot; and communicating relations between the second slot segments and the outer edge of the rotor core are consistent between the magnetic barriers disposed on a side of the respective permanent magnet slot.

13. The rotor according to claim 1, wherein:

the one or more magnetic barriers comprises a plurality of magnetic barriers disposed on at least one side of the respective permanent magnet slot;

each of the magnetic barriers comprises the first slot segment and the second slot segment;

communicating relations between the first slot segments and the permanent magnet slot are inconsistent between the magnetic barriers disposed on a side of the respective permanent magnet slot; and communicating relations between the second slot segments and the outer edge of the rotor core are inconsistent between the magnetic barriers disposed on a side of the respective permanent magnet slot.

14. The rotor according to claim 1, wherein:

an end of the first slot segment does not communicate with the permanent magnet slot; and an end of the second slot segment does not communicate with the outer edge of the rotor core.

15. The rotor according to claim 1, wherein an angle between the first slot segment and the second slot segment is [60°, 120°].

16. The rotor according to claim 1, wherein;

the rotor core comprises a plurality of laminated punching sheets;

the permanent magnet slots are formed by the laminated punching sheets; and the punching sheets form a plurality of core segments disposed along an axial direction of the rotor core to form the rotor core.

17. A motor comprising:

a stator; and the rotor according to claim 1, wherein the rotor is coaxially disposed within the stator.

18. The motor according to claim 17, wherein;

the stator comprises a stator core and a stator winding;

the stator core comprises a plurality of stator convex teeth that are arranged in a circumferential direction of the stator core; and the stator winding is wound around the plurality of stator convex teeth.

19. A laundry treatment device comprising:

a housing; and the motor according to claim 17 provided in the housing.

* * * * *